(12) United States Patent
Tsai et al.

(10) Patent No.: US 8,743,486 B2
(45) Date of Patent: Jun. 3, 2014

(54) OPTICAL IMAGE CAPTURING LENS SYSTEM

(71) Applicant: Largan Precision Co., Ltd., Taichung (TW)

(72) Inventors: Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 100 days.

(21) Appl. No.: 13/657,075

(22) Filed: Oct. 22, 2012

(65) Prior Publication Data

US 2013/0301145 A1   Nov. 14, 2013

(30) Foreign Application Priority Data

May 14, 2012  (TW) .............................. 101117114 A

(51) Int. Cl.
| | |
|---|---|
| *G02B 9/12* | (2006.01) |
| *G02B 13/18* | (2006.01) |
| *G02B 3/02* | (2006.01) |
| *G02B 13/00* | (2006.01) |

(52) U.S. Cl.
CPC .............. *G02B 9/12* (2013.01); *G02B 13/0035* (2013.01)
USPC ........................................ 359/791; 359/716

(58) Field of Classification Search
CPC ...... G02B 9/12; G02B 13/0035; G02B 13/18; G02B 13/001
USPC .................................................... 359/716, 791
See application file for complete search history.

(56) References Cited

U.S. PATENT DOCUMENTS

2004/0196575 A1* 10/2004 Nozawa ........................ 359/791

* cited by examiner

Primary Examiner — Alicia M Harrington
(74) Attorney, Agent, or Firm — CKC & Partners Co., Ltd.

(57) ABSTRACT

An optical image capturing lens system includes, in order from an object side to an image side, a first lens element, a second lens element and a third lens element. The first lens element with positive refractive power has an object-side surface being convex at a paraxial region. The second lens element with positive refractive power is made of plastic material, and has an object-side surface being convex at a paraxial region and an image-side surface being concave at a paraxial region, wherein the surfaces of the second lens element are aspheric. The third lens element with negative refractive power is made of plastic material, and has an object-side surface being concave or planar at a paraxial region and an image-side surface being concave at a paraxial region and being convex at a peripheral region, wherein the surfaces of the third lens element are aspheric.

22 Claims, 19 Drawing Sheets

OPTICAL IMAGE CAPTURING LENS SYSTEM

RELATED APPLICATIONS

The application claims priority to Taiwan Application Serial Number 101117114, filed May 14, 2012, which is herein incorporated by reference.

BACKGROUND

1. Technical Field

The present invention relates to an optical image capturing lens system. More particularly, the present invention relates to a compact optical image capturing lens system applicable to electronic products and three-dimensional (3D) image applications thereof.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a structure of two-element lens such as the one disclosed in U.S. Pat. No. 7,957,076 B2. The ability of the two-element lens system for correcting the aberration thereof cannot satisfy the requirement of the high-end optical lens system. Although other conventional optical lens systems with four-element lens structure such as the one disclosed in U.S. Pat. No. 8,089,704 B2. However, the compact size thereof is limited by the number of the lens elements, and the costs together with the assembly of the optical lens system are more complicated.

In order to obtain a high image quality and to keep size compact, an optical lens system with three-element lens structure is provided, such as U.S. Pat. No. 7,515,358. Since the optical lens system includes a first lens element with positive refractive power and a second lens element with negative refractive power, the optical lens system does not equip with a good telephoto functionality and the total track length cannot be reduced. Furthermore, the third lens element has positive refractive power, so that the principal point thereof cannot be positioned away from an image plane, and the back focal length thereof cannot be effectively reduced. Therefore, it is hard to apply to the compact electronic products.

SUMMARY

According to one aspect of the present disclosure, an optical image capturing lens system includes, in order from an object side to an image side, a first lens element, a second lens element and a third lens element. The first lens element with positive refractive power has an object-side surface being convex at a paraxial region. The second lens element with positive refractive power is made of plastic material, and has an object-side surface being convex at a paraxial region and an image-side surface being concave at a paraxial region, wherein the object-side surface and the image-side surface of the second lens element are aspheric. The third lens element with negative refractive power is made of plastic material, and has an object-side surface being concave or planar at a paraxial region and an image-side surface being concave at a paraxial region and being convex at a peripheral region, wherein the object-side surface and the image-side surface of the third lens element are aspheric. When a curvature radius of the mage-side surface of the second lens element is R4, and a curvature radius of the object-side surface of the third lens element is R5, the following relationship is satisfied:

$-1.0 \le (R4+R5)/(R4-R5) < 1.0$.

According to another aspect of the present disclosure, an optical image capturing lens system includes, in order from an object side to an image side, a first lens element, a second lens element and a third lens element. The first lens element with positive refractive power has an object-side surface being convex at a paraxial region. The second lens element with positive refractive power is made of plastic material, and has an object-side surface being convex at a paraxial region and an image-side surface being concave at a paraxial region, wherein the object-side surface and the image-side surface of the second lens element are aspheric. The third lens element with negative refractive power is made of plastic material, and has an object-side surface being concave or planar at a paraxial region and an image-side surface being concave at a paraxial region and being convex at a peripheral region, wherein the object-side surface and the image-side surface of the third lens element are aspheric. When a curvature radius of the image-side surface of the second lens element is R4, a curvature radius of the object-side surface of the third lens element is R5, a central thickness of the second lens element is CT2, and a central thickness of the third lens element is CT3, the following relationships are satisfied:

$-1.0 \le (R4+R5)/(R4-R5) < 1.0$; and $0 < CT2/CT3 < 0.70$.

DETAILED DESCRIPTION

Figure 1:
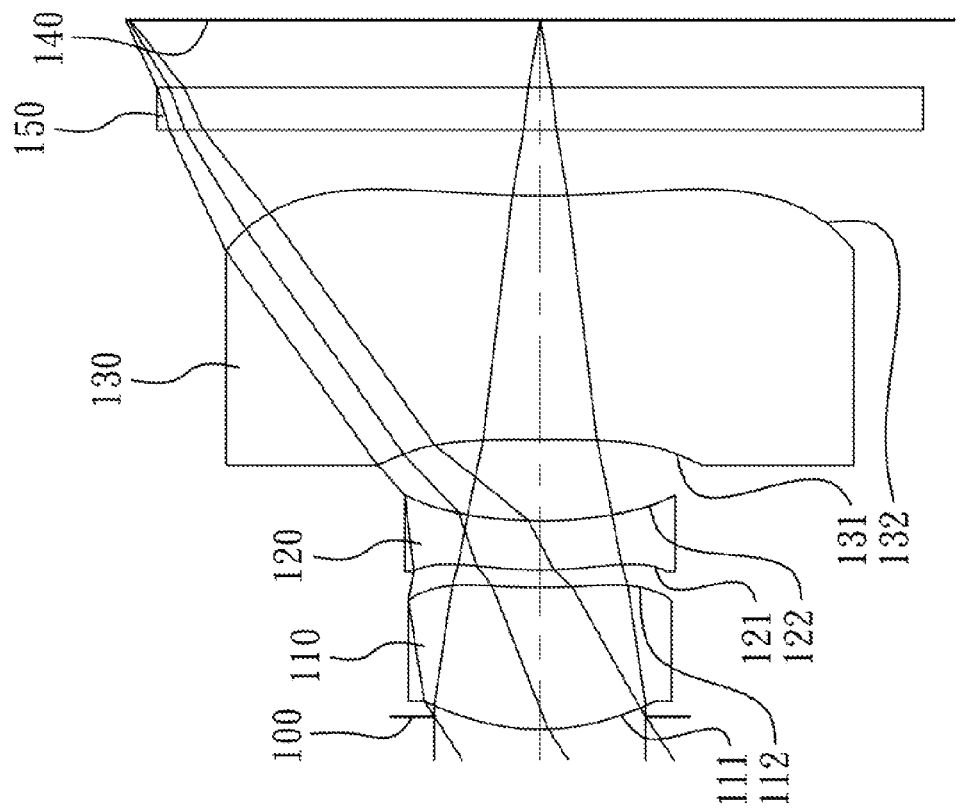
FIG. 1 is a schematic view of an optical image capturing lens system to according to the 1st embodiment of the present disclosure.

An optical image capturing lens system includes, in order from an object side to an image side, a first lens element, a second lens element and a third lens element.

The first lens element with positive refractive power provides proper positive refractive power for the optical image capturing lens system. The first lens element has an object-side surface being convex at a paraxial region, so that the total track length of the optical image capturing lens system can be reduced by adjusting the positive refractive power of the first lens element.

The second lens element with positive refractive power can enhance the telephoto functionality of the optical image capturing lens system by combining with the positive refractive power of the first lens element for reducing the total track length thereof. The second lens element has an object-side surface being convex at a paraxial region and being concave at a peripheral region, and an image-side surface being concave at a paraxial region, so that the astigmatism of the optical image capturing lens system can be corrected and the angle at which the incident light projects onto an image sensor from the off-axis field can be effectively reduced for increasing the receiving efficiency of the image sensor, and can further correct the aberration thereof.

The third lens element has negative refractive power, so that the principal point of the optical image capturing lens system can be positioned away from an image plane, and the back focal length of the optical image capturing lens system can be reduced. The third lens element has an object-side surface being concave or planar at a paraxial region, and an image-side surface being concave at a paraxial region and being convex at a peripheral region, that is, an axial distance between the image-side surface of the third lens element and the image plane is BID which decreases and then increases from the paraxial region to the peripheral region of the image-side surface of the third lens element. Therefore, the somatic aberration (Coma) of the optical image capturing lens system can be corrected effectively for avoiding the vague image at the peripheral region of the image, so that the image quality can be enhanced.

When a curvature radius of the image-side surface of the second lens element is R4, and a curvature radius of the object-side surface of the third lens element is R5, the following relationship is satisfied:

$$-1.0 \le (R4+R5)/(R4-R5) < 1.0.$$

Therefore, the distribution of the positive refractive power can be balanced by properly adjusting the curvature of the image-side surface of the second lens element and the object-side surface of the third lens element, so that the sensitivity of the optical image capturing lens system can be reduced and the aberration generated from the lens elements with positive refractive power can be corrected.

R4 and R5 can further satisfy the following relationship:

$$-1.0 \le (R4+R5)/(R4-R5) < 0.$$

When a focal length of the optical image capturing lens system is f, and a focal length of the second lens element is f2, the following relationship is satisfied:

$$0 < f/f2 < 0.65.$$

Therefore, the telephoto functionality of the optical image capturing lens system can be enhanced and the total track length thereof can be reduced by adjusting the positive refractive power of the second lens element.

f and f2 can further satisfy the following relationship:

$$0 < f/f2 < 0.35.$$

When the focal length of the optical image capturing lens system is f, and the curvature radius of the object-side surface of the third lens element is R5, the following relationship is satisfied:

$$-1.0 < f/R5 < 0.$$

Therefore, the principal point of the optical image capturing lens system can be positioned away from the image plane, and the total track length thereof can be reduced by adjusting the curvature of the object-side surface of the third lens element.

When an Abbe number of the first lens element is V1, and an Abbe number of the third lens element is V3, the following relationship is satisfied:

$$20 < V1-V3 < 45.$$

Therefore, the chromatic aberration of the optical image capturing lens system can be corrected.

V1 and V3 can further satisfy the following relationship:

$$28 < V1-V3 < 45.$$

When the focal length of the optical image capturing lens system is f, a focal length of the first lens element is f1 the focal length of the second lens element is f2, and a focal length of the third lens element is f3, the following relationship is satisfied:

$$1.3 < (f/f1)+(f/f2)-(f/f3) < 2.7.$$

Therefore, the distribution of the refractive power of the lens elements will be proper; the optical image capturing lens system can thereby obtain the good telephoto functionality for reducing the total track length thereof. When the principal point of the optical image capturing lens system is positioned away from the image plane, the total track length thereof can be further reduced so as to maintain the compact size of the optical image capturing lens system.

When an axial distance between the mage-side surface of the third lens element and the image plane is BL, and an axial distance between the object-side surface of the first lens element and the image plane is TL, the following relationship is satisfied:

$$0.10 < BL/TL < 0.35.$$

Therefore, the back focal length of the optical image capturing lens system can be properly adjusted for educing the total track length thereof.

When a horizontal distance between a maximum effective diameter position on the image-side surface of the second lens element and a maximum effective diameter position on the object-side surface of the third lens element is ET23, and an axial distance between the second lens element and the third lens element is T23, the following relationship is satisfied:

$$0 < ET23/T23 < 0.80.$$

Therefore, the distance between each lens element is proper, and it is favorable for assembling the lens elements of the optical image capturing lens system to enhance the manufacturing yield rate and for keeping the system compact thereof.

When a central thickness of the second lens element is CT2, and a central thickness of the third lens element is CT3, the following relationship is satisfied:

$$0 < CT2/CT3 < 0.50.$$

Therefore, the thickness of the second lens element and the third lens element is favorable for manufacturing and assembling the optical image capturing lens system and thereby the manufacturing yield rate can be increased.

According to the optical image capturing lens system of the present disclosure, the lens elements thereof can be made of glass or plastic material. When the lens elements are made of glass material, the distribution of the refractive power of the optical image capturing lens system may be more flexible to design. When the lens elements are made of plastic material, the manufacturing cost can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the optical image capturing lens system can also be reduced.

According to the optical image capturing lens system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; and when the lens element has a concave surface, it indicates that the paraxial region of the surface is concave.

According to the optical image capturing lens system of the present disclosure, the optical image capturing lens system can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the above description of the present disclosure, the following 1st-9th specific embodiments are provided for further explanation.

1st Embodiment

Figure 2:
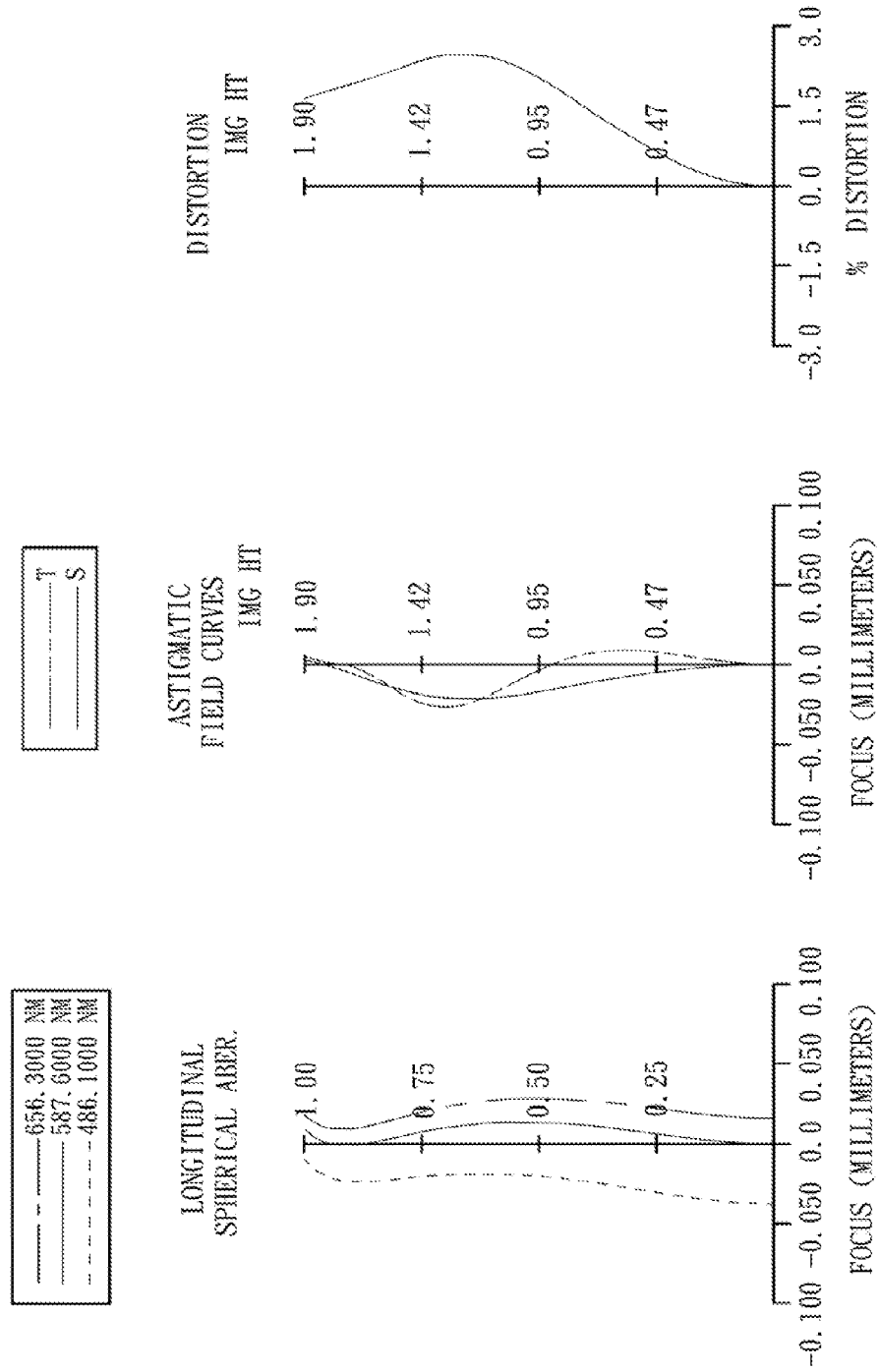
FIG. 2 shows spherical aberration curves, astigmatic field curves and a distortion curve of the optical image capturing lens system according to the 1st embodiment.

FIG. 1 is a schematic view of an optical image capturing lens system according to the 1st embodiment of the present disclosure. FIG. 2 shows spherical aberration curves, astigmatic field curves and a distortion curve of the optical image capturing lens system according to the 1st embodiment. In FIG. 1, the optical image capturing lens system includes, in order from an object side to an mage side, an aperture stop 100, a first lens element 110, a second lens element 120, a third lens element 130, an IR-cut filter 150 and an image plane 140.

The first lens element 110 with positive refractive power has an object-side surface 111 being convex at a paraxial region and an image-side surface 112 being concave at a paraxial region. The first lens element 110 is made of plastic material, and has the object-side surface 111 and the image-side surface 112 being aspheric.

The second lens element 120 with positive refractive power has an object-side surface 121 being convex at a paraxial region and being concave at a peripheral region, and an image-side surface 122 being concave at a paraxial region. The second lens element 120 is made of plastic material, and has the object-side surface 121 and the image-side surface 122 being aspheric.

Figure 19:
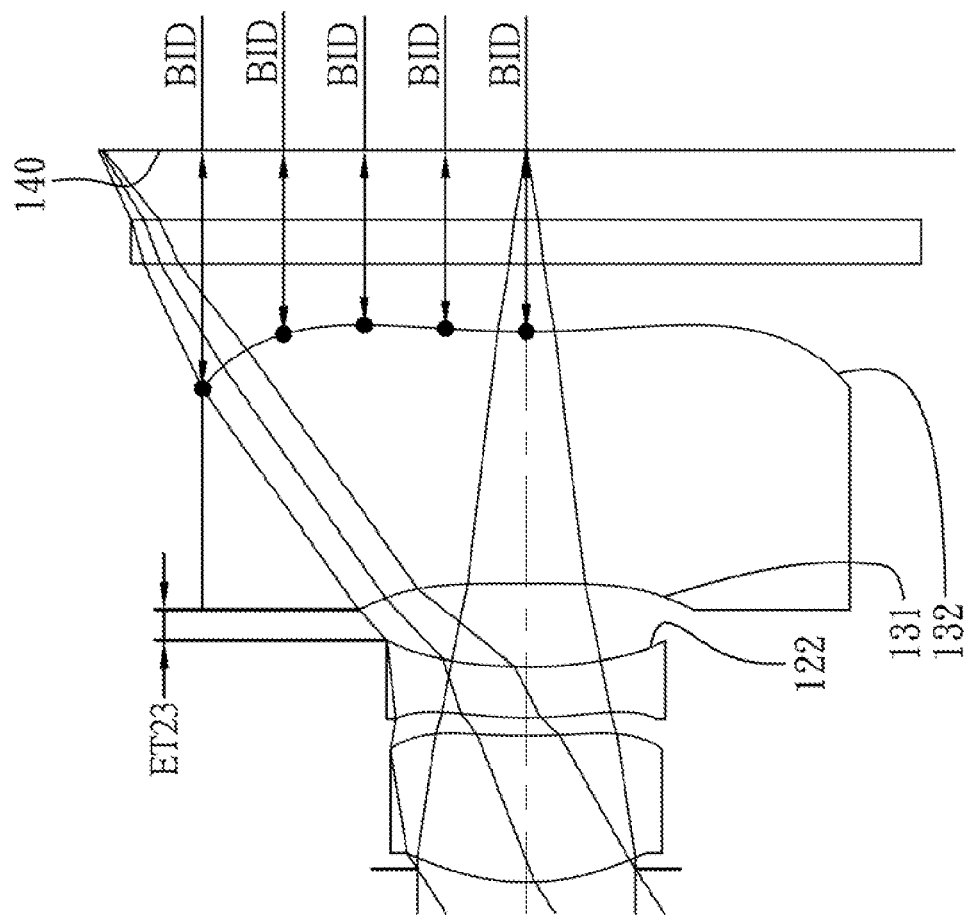
FIG. 19 shows the parameters BID and ET23 among the second lens element, the third lens element and the image plane of the optical image capturing lens system based on FIG. 1.

The third lens element 130 with negative refractive power has an object-side surface 13 being concave at a paraxial region, and an image-side surface 132 being concave at a paraxial region and being convex at a peripheral region. The third lens element 130 is made of plastic material, and has the object-side surface 131 and the image-side surface 132 being aspheric. Furthermore, FIG. 19 shows the parameters BID and ET23 among the second lens element 120, the third lens element 130 and the image plane 140 of the optical image capturing lens system based on FIG. 1. In FIG. 19, an axial distance between the image-side surface 132 of the third lens element 130 and the image plane 140 is BID which decreases and then increases from the paraxial region to the peripheral region of the image-side surface 132 of the third lens element 130.

The IR-cut filter 150 is made of glass, and located between the third lens element 130 and the image plane 140, and will not affect the focal length of the optical image capturing lens system.

The equation of the aspheric surface profiles of the aforementioned lens elements of the 1st embodiment is expressed as follows:

$$X(Y) = (Y^2/R)/(1 + \operatorname{sqrt}(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient,

In the optical image capturing lens system according to the 1st embodiment, when a focal length of the optical image capturing lens system is f, an f-number of the optical image capturing lens system is Fno, and half of the maximal field of view of the optical image capturing lens system is HFOV, these parameters have the following values:

f=2.88 mm;

Fno=2.95; and

HFOV=33.0 degrees.

In the optical image capturing lens system according to the 1st embodiment, when an Abbe number of the first lens element 110 is V1, and an Abbe number of the third lens element 130 is V3, the following relationship is satisfied:

$V1-V3=0.0$.

In the optical image capturing lens system according to the 1st embodiment, when a central thickness of the second lens element 120 is CT2, and a central thickness of the third lens element 130 is CT3, the following relationship is satisfied:

$CT2/CT3=0.201$.

In the optical image capturing lens system according to the 1st embodiment, when a horizontal distance between a maximum effective diameter position on the mage-side surface 122 of the second lens element 120 and a maximum effective diameter position on the object-side surface 131 of the third lens element 130 is ET23 (shown in FIG. 19), and an axial distance between the second lens element 120 and the third lens element 130 is T23, the following relationship is satisfied:

$ET23/T23=0.37$.

In the optical image capturing lens system according to the 1st embodiment, when an axial distance between the image-side surface 132 of the third lens element 130 and the image plane 140 is BL, and an axial distance between the object-side surface 111 of the first lens element 110 and the image plane 140 is TL, the following relationship is satisfied:

$BL/TL=0.247$.

In the optical image capturing lens system according to the 1st embodiment, when a curvature radius of the image-side surface 122 of the second lens element 120 is R4, and a curvature radius of the object-side surface 131 of the third lens element 130 is R5, the following relationship is satisfied:

$(R4+R5)/(R4-R5)=-0.95$.

In the optical image capturing lens system according to the 1st embodiment, when the focal length of the optical image capturing lens system is f, and the curvature radius of the object-side surface 131 of the third lens element 130 is R5, the following relationship is satisfied:

$f/R5=-0.04$.

In the optical image capturing lens system according to the 1st embodiment, when the focal length of the optical image capturing lens system is f, and a focal length of the second lens element 120 is f2, the following relationship is satisfied:

$f/f2=0.13$.

In the optical image capturing lens system according to the 1st embodiment, when the focal length of the optical image capturing lens system is f, a focal length of the first lens element 110 is f1, the focal length of the second lens element 120 is f2, and a focal length of the third lens element 130 is f3, the following relationship is satisfied:

$(f/f1)+(f/f2)-(f/f3)=1.45$.

The detailed optical data of the 1st embodiment are shown in Table 1 and the aspheric surface data are shown in Table 2 below.

TABLE 1

1st Embodiment
f = 2.88 mm, Fno = 2.95, HFOV = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.059 | | | | |
| 2 | Lens 1 | 1.087 (ASP) | 0.654 | Plastic | 1.544 | 55.9 | 3.02 |
| 3 | | 2.526 (ASP) | 0.081 | | | | |
| 4 | Lens 2 | 1.712 (ASP) | 0.227 | Plastic | 1.640 | 23.3 | 21.45 |
| 5 | | 1.854 (ASP) | 0.374 | | | | |
| 6 | Lens 3 | −79.796 (ASP) | 1.128 | Plastic | 1.544 | 55.9 | −7.86 |
| 7 | | 4.541 (ASP) | 0.300 | | | | |
| 8 | IR-cut filter | Plano | 0.200 | Glass | 1.517 | 64.2 | — |
| 9 | | Plano | 0.310 | | | | |
| 10 | Image | Plano | — | | | | |

Note:
Reference wavelength (d-line) is 587.6 nm.

TABLE 2

Aspheric Coefficients

| Surface # | 2 | 3 | 4 | 5 | 6 | 7 |
|---|---|---|---|---|---|---|
| k = | −4.8229E−01 | −2.0000E+01 | −2.0000E+01 | −1.6439E+01 | −1.0000E+00 | 4.5718E+00 |
| A4 = | −2.1954E−02 | −6.8225E−01 | −4.0699E−01 | 2.7477E−02 | −4.3202E.01 | −1.1462E−01 |

TABLE 2-continued

Aspheric Coefficients

| Surface # | 2 | 3 | 4 | 5 | 6 | 7 |
|---|---|---|---|---|---|---|
| A6 =  | 4.2791E−03  | −2.0942E−01 | −3.6322E−01 | 3.3428E−01  | 1.3835E−01  | 1.2896E−02  |
| A8 =  | −6.5822E−01 | −1.1747E+00 | −1.4476E+00 | 5.5588E−01  | −2.0342E−01 | −1.2444E−02 |
| A10 = | 2.0341E+00  | −4.0915E−01 | 2.7823E+00  | 1.5444E+00  | −8.1193E−02 | 3.8168E−03  |
| A12 = | −2.7521E+00 | 2.0852E+00  | 2.4462E+00  | 1.2972E−01  | 2.8459E−01  | 7.4203E−05  |
| A14 = | −1.1782E+01 | 1.1865E−01  | −2.5287E+01 | −8.8553E+00 | 7.6204E−01  | −4.0540E−04 |

In Table 1, the curvature radius, the thickness and the focal length are shown in millimeters (mm). Surface numbers 0-10 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
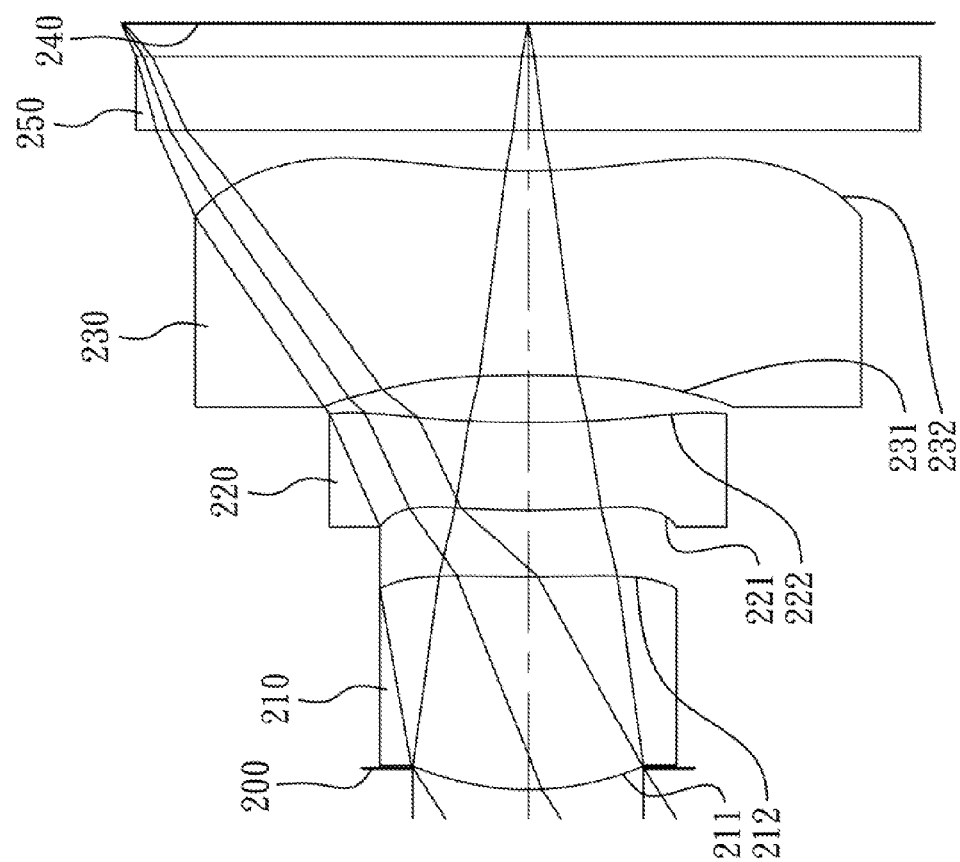
FIG. 3 is a schematic view of an optical image capturing lens system according to the 2nd embodiment of the present disclosure.
Figure 4:
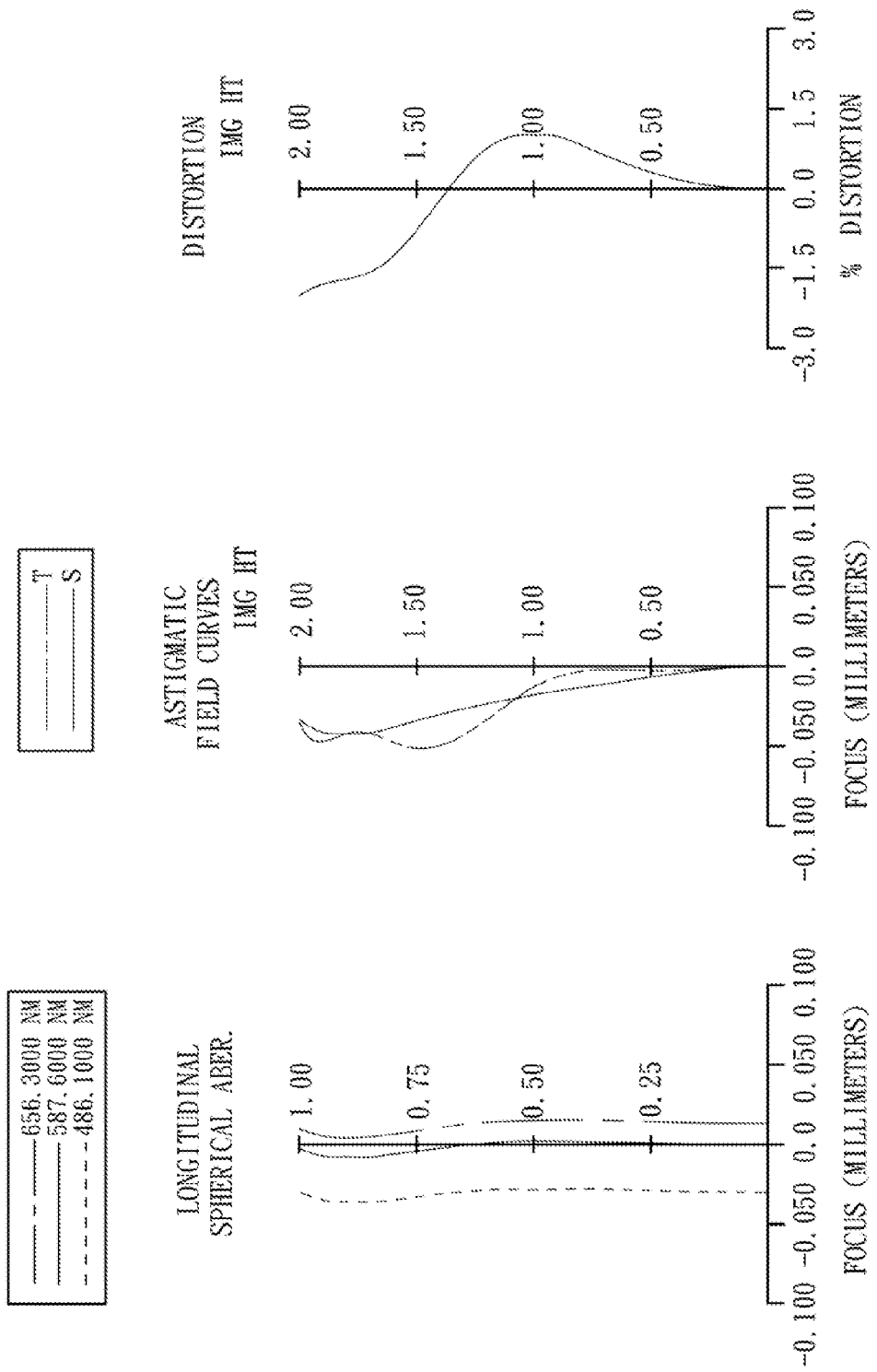
FIG. 4 shows spherical aberration curves, astigmatic field curves and a distortion curve of the optical image capturing lens system according to the 2nd embodiment.

FIG. 3 is a schematic view of an optical image capturing lens system according to the 2nd embodiment of the present disclosure. FIG. 4 shows spherical aberration curves, astigmatic field curves and a distortion curve of the optical image capturing lens system according to the 2nd embodiment. In FIG. 3, the optical image capturing lens system includes, in order from an object side to an image side, an aperture stop 200, a first lens element 210, a second lens element 220, a third lens element 230, an IR-cut filter 250 and an image plane 240.

The first lens element 210 with positive refractive power has an object-side surface 211 being convex at a paraxial region and an image-side surface 212 being concave at a paraxial region. The first lens element 210 is made of plastic material, and has the object-side surface 211 and the image-side surface 212 being aspheric.

The second lens element 220 with positive refractive power has an object-side surface 221 being convex at a paraxial region and being concave at a peripheral region, and an image-side surface 222 being concave at a paraxial region. The second lens element 220 is made of plastic material, and has the object-side surface 221 and the image-side surface 222 being aspheric.

The third lens element 230 with negative refractive power has an object-side surface 231 being concave at a paraxial region, and an image-side surface 232 being concave at a paraxial region and being convex at a peripheral region. The third lens element 230 is made of plastic material, and has the object-side surface 231 and the image-side surface 232 being aspheric. Furthermore, an axial distance between the image-side surface 232 of the third lens element 230 and the image plane 240 is BID which decreases and then increases from the paraxial region to the peripheral region of the image-side surface 232 of the third lens element 230 (As shown in FIG. 19).

The IR-cut filter 250 is made of glass, and located between the third lens element 230 and the image plane 240, and will not affect the focal length of the optical image capturing lens system.

The detailed optical data of the 2nd embodiment are shown in Table 3 to and the aspheric surface data are shown in Table 4 below.

TABLE 3

2nd Embodiment
f = 3.16 mm, Fno = 2.78, HFOV = 32.9 deg.

| Surface # | | Curvature Radius | | Thickness | Material | Index | Abbe # | Focal length |
|---|---|---|---|---|---|---|---|---|
| 0 | Object   | Plano  |       | Infinity |         |       |      |       |
| 1 | Ape. Stop| Plano  |       | −0.106   |         |       |      |       |
| 2 | Lens 1   | 1.411  | (ASP) | 1.048    | Plastic | 1.544 | 55.9 | 2.87  |
| 3 |          | 10.813 | (ASP) | 0.331    |         |       |      |       |
| 4 | Lens 2   | 4.549  | (ASP) | 0.432    | Plastic | 1.632 | 23.4 | 23.77 |
| 5 |          | 6.284  | (ASP) | 0.234    |         |       |      |       |
| 6 | Lens 3   | −7.774 | (ASP) | 1.009    | Plastic | 1.583 | 30.2 | −3.65 |
| 7 |          | 3.076  | (ASP) | 0.200    |         |       |      |       |
| 8 | IR-cut filter | Plano |   | 0.363    | Glass   | 1.517 | 64.2 | —     |
| 9 |          | Plano  |       | 0.165    |         |       |      |       |
| 10| Image    | Plano  |       | —        |         |       |      |       |

Note:
Reference wavelength (d-line) is 587.6 nm.

TABLE 4

Aspheric Coefficients

| Surface # | 2 | 3 | 4 | 5 | 6 | 7 |
|---|---|---|---|---|---|---|
| k =  | −5.9759E−01 | −5.7640E+01 | −3.7358E+00 | 8.5919E+00  | −8.9606E+00 | −2.2905E+01 |
| A4 = | −8.3951E−03 | −1.3150E−01 | −9.0286E−02 | 3.9811E−02  | −2.0835E−01 | −5.0088E−02 |
| A6 = | −7.0831E−03 | −1.8985E−01 | −3.9474E−01 | −4.8922E−02 | 7.8256E−02  | −2.8248E−04 |

TABLE 4-continued

Aspheric Coefficients

| Surface # | 2 | 3 | 4 | 5 | 6 | 7 |
|---|---|---|---|---|---|---|
| A8 =  | 3.9282E−02 | −1.8457E−01 | −4.5626E−02 | −9.6159E−02 | 1.1005E−01 | −6.1658E−03 |
| A10 = | −2.3717E−01 | 6.1629E−02  | 8.5577E−02  | 6.2043E−02  | 5.9818E−03 | 1.1259E−03 |
| A12 = |             |             | −2.3015E+00 |             | −4.8568E−02 | 5.1541E−04 |
| A14 = |             |             |             |             | −3.2060E−02 | 8.5508E−05 |
| A16 = |             |             |             |             | 3.5331E−03  | −7.7094E−05 |

In the optical image capturing lens system according to the 2nd embodiment, the definitions of f, Fno, HFOV, V1, V3, CT2, CT3, ET23, T23, BL, TL, R4, R5, f1, f2 and f3 are the same as those stated in the 1st embodiment with corresponding values for the 2nd embodiment. Moreover, these parameters can be calculated from Table 3 and Table 4 as the following values and satisfy the following relationships:

| f (mm)     | 3.16  | BL/TL             | 0.193 |
| Fno        | 2.78  | (R4 + R5)/(R4 − R5) | −0.11 |
| HFOV (deg.)| 32.9  | f/R5              | −0.41 |
| V1 − V3    | 25.7  | f/f2              | 0.13  |
| CT2/CT3    | 0.428 | (f/f1) + (f/f2) − (f/f3) | 2.10 |
| ET23/T23   | 0.14  |                   |       |

3rd Embodiment

Figure 5:
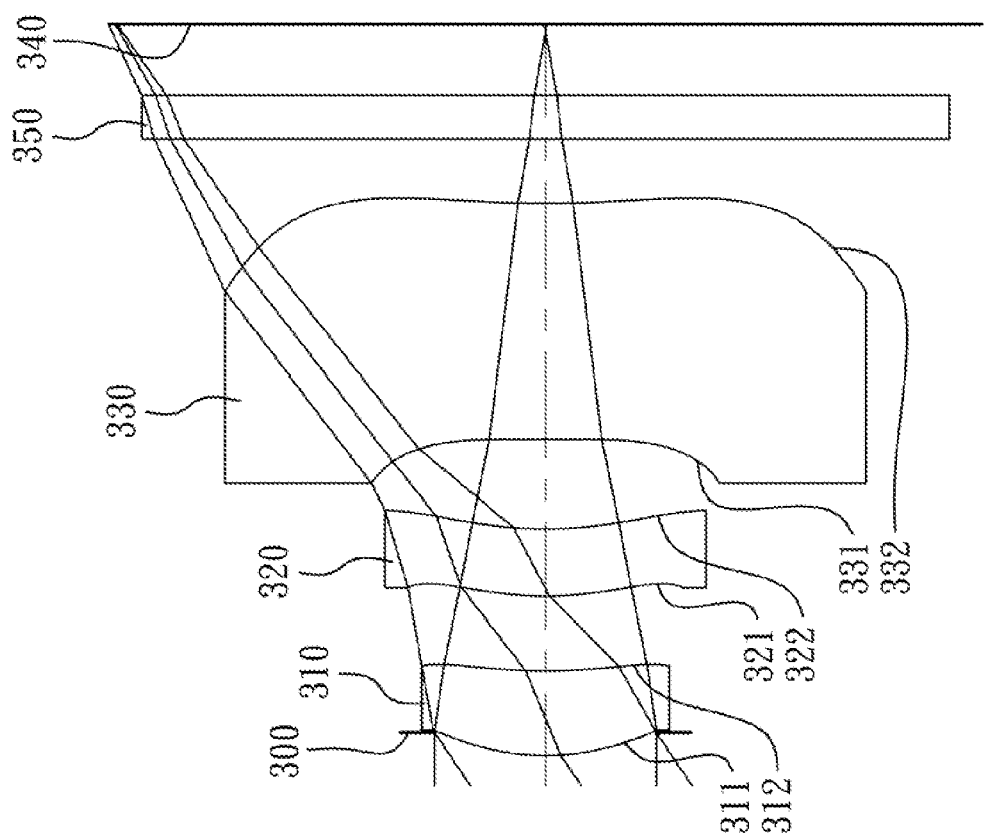
FIG. 5 is a schematic view of an optical image capturing lens system according to the 3rd embodiment of the present disclosure.
Figure 6:
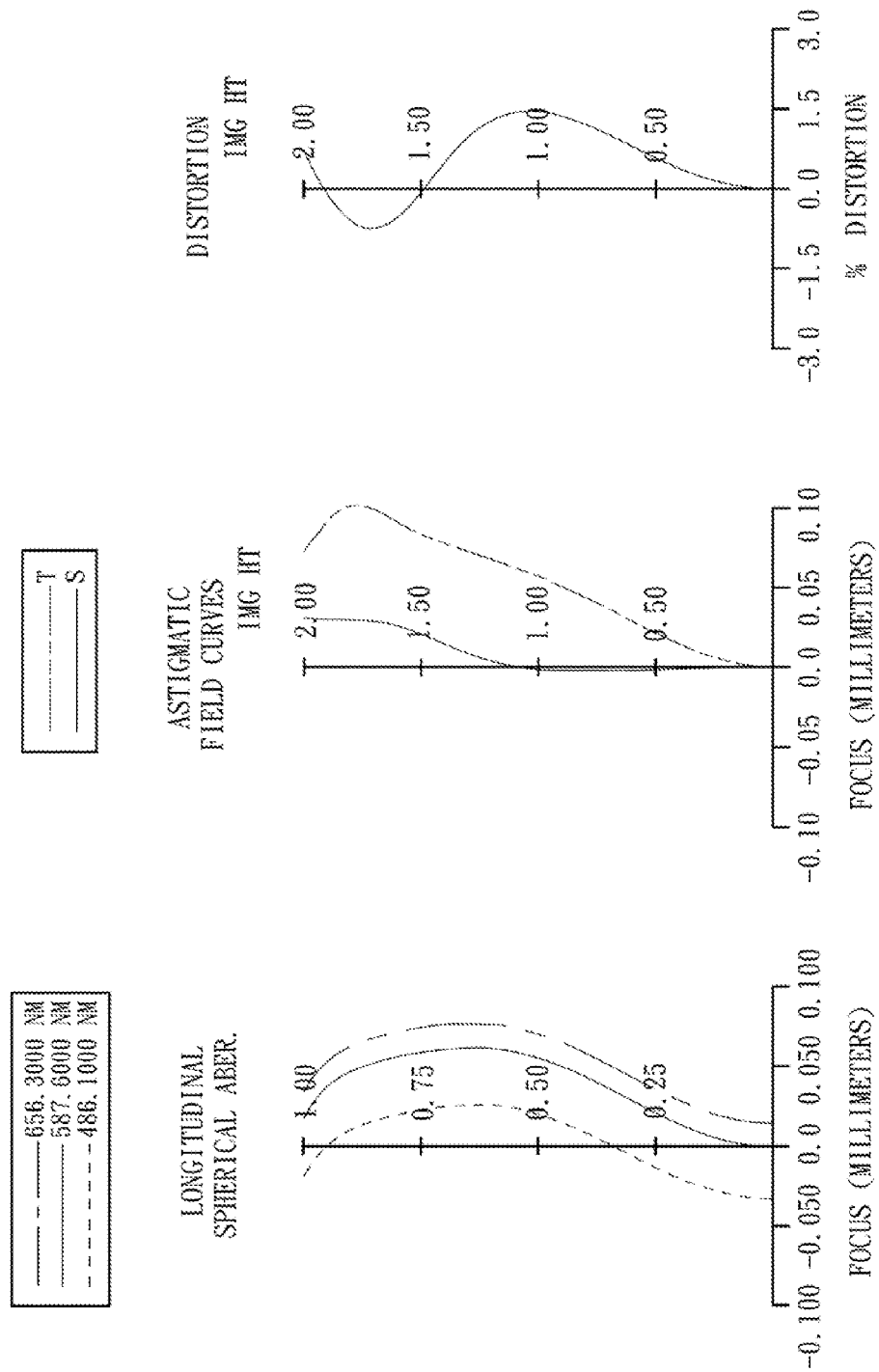
FIG. 6 shows spherical aberration curves, astigmatic field curves and a distortion curve of the optical image capturing lens system according to the 3rd embodiment.

FIG. 5 is a schematic view of an optical image capturing lens system according to the 3rd embodiment of the present disclosure. FIG. 6 shows spherical aberration curves, astigmatic field curves and a distortion curve of the optical image capturing lens system according to the 3rd embodiment. In FIG. 5, the optical image capturing lens system includes, in order from an object side to an image side, an aperture stop 300, a first lens element 310, a second lens element 320, a third lens element 330, an IR-cut filter 350 and an image plane 340.

The first lens element 310 with positive refractive power has an object-side surface 311 being convex at a paraxial region and an image-side surface 312 being concave at a paraxial region. The first lens element 310 is made of plastic material, and has the object-side surface 311 and the image-side surface 312 being aspheric.

The second lens element 320 with positive refractive power has an object-side surface 321 being convex at a paraxial region and being concave at a peripheral region, and an image-side surface 322 being concave at a paraxial region. The second lens element 320 is made of plastic material, and has the object-side surface 321 and the image-side surface 322 being aspheric.

The third lens element 330 with negative refractive power has an object-side surface 331 being concave at a paraxial region, and an image-side surface 332 being concave at a paraxial region and being convex at a peripheral region. The third lens element 330 is made of plastic material, and has the object-side surface 331 and the image-side surface 332 being aspheric. Furthermore, an axial distance between the image-side surface 332 of the third lens element 330 and the image plane 340 is BID which decreases and then increases from the paraxial region to the peripheral region of the image-side surface 332 of the third lens element 330 (As shown in FIG. 19).

The IR-cut filter 350 is made of glass, and located between the third lens element 330 and the image plane 340, and will not affect the focal length of the optical image capturing lens system.

The detailed optical data of the 3rd embodiment are shown in Table 5 and the aspheric surface data are shown in Table 6 below.

TABLE 5

3rd Embodiment
f = 2.96 mm, Fno = 2.87, HFOV = 33.5 deg.

| Surface # |   | Curvature Radius | Thickness | Material | Index | Abbe # | Focal length |
|---|---|---|---|---|---|---|---|
| 0  | Object       | Plano            | Infinity |         |       |      |       |
| 1  | Ape. Stop    | Plano            | −0.108   |         |       |      |       |
| 2  | Lens 1       | 1.099 (ASP)      | 0.394    | Plastic | 1.544 | 55.9 | 3.33  |
| 3  |              | 2.441 (ASP)      | 0.346    |         |       |      |       |
| 4  | Lens 2       | 1.556 (ASP)      | 0.314    | Plastic | 1.544 | 55.9 | 15.98 |
| 5  |              | 1.760 (ASP)      | 0.418    |         |       |      |       |
| 6  | Lens 3       | −102.250 (ASP)   | 1.097    | Plastic | 1.544 | 55.9 | −8.71 |
| 7  |              | 4.991 (ASP)      | 0.300    |         |       |      |       |
| 8  | IR-cut filter| Plano            | 0.200    | Glass   | 1.517 | 64.2 | —     |
| 9  |              | Plano            | 0.334    |         |       |      |       |
| 10 | Image        | Plano            | —        |         |       |      |       |

Note:
Reference wavelength (d-line) is 587.6 nm.

TABLE 6

Aspheric Coefficients

| Surface # | 2 | 3 | 4 | 5 | 6 | 7 |
|---|---|---|---|---|---|---|
| k = | −8.9984E−01 | −9.9729E+00 | −1.2330E+01 | −1.4724E+01 | −1.0000E−00 | 4.4456E+00 |
| A4 = | −5.1268E−02 | −1.8380E−01 | −6.2025E−02 | 3.4726E−02 | −3.5088E−01 | −1.1046E−01 |
| A6 = | 1.4721E−01 | −1.5787E−01 | −1.5219E−02 | −3.4890E−02 | 5.9720E−02 | −7.5890E−04 |
| A8 = | −4.8748E−01 | −5.6567E−01 | −1.3064E+00 | −4.4271E−01 | −2.6837E−01 | −5.3248E−03 |
| A10 = | −1.8379E+00 | −1.6415E+00 | 2.9170E−01 | −6.4037E−02 | −1.1942E−01 | −8.3552E−04 |
| A12 = | 2.4923E+00 | 1.6881E+00 | −2.2061E+00 | 1.1077E−01 | 5.1384E−02 | 3.2139E−04 |
| A14 = | −5.6824E−01 | −3.7201E−01 | −2.0166E+00 | 8.1163E−01 | −1.7712E−01 | 6.9666E−05 |

In the optical image capturing lens system according to the 3rd embodiment, the definitions of f, Fno, HFOV, V1, V3, CT2, CT3, ET23, T23, BL, TL, R4, R5, f1, f2 and f3 are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 2.96 | BL/TL | 0.245 |
| Fno | 2.87 | (R4 + R5)/(R4 − R5) | −0.97 |
| HFOV (deg.) | 33.5 | f/R5 | −0.03 |
| V1 − V3 | 0.0 | f/f2 | 0.19 |
| CT2/CT3 | 0.286 | (f/f1) + (f/f2) − (f/f3) | 1.41 |
| ET23/T23 | 0.30 | | |

4th Embodiment

Figure 7:
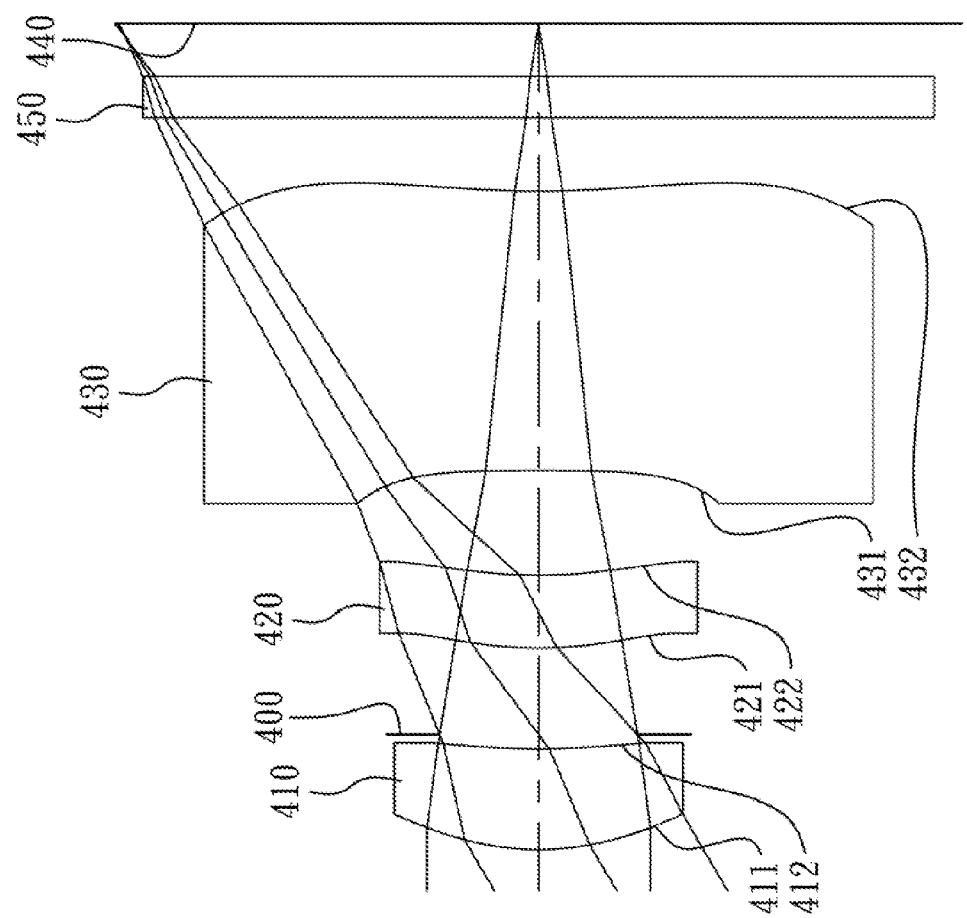
FIG. 7 is a schematic view of an optical image capturing lens system according to the 4th embodiment of the present disclosure.
Figure 8:
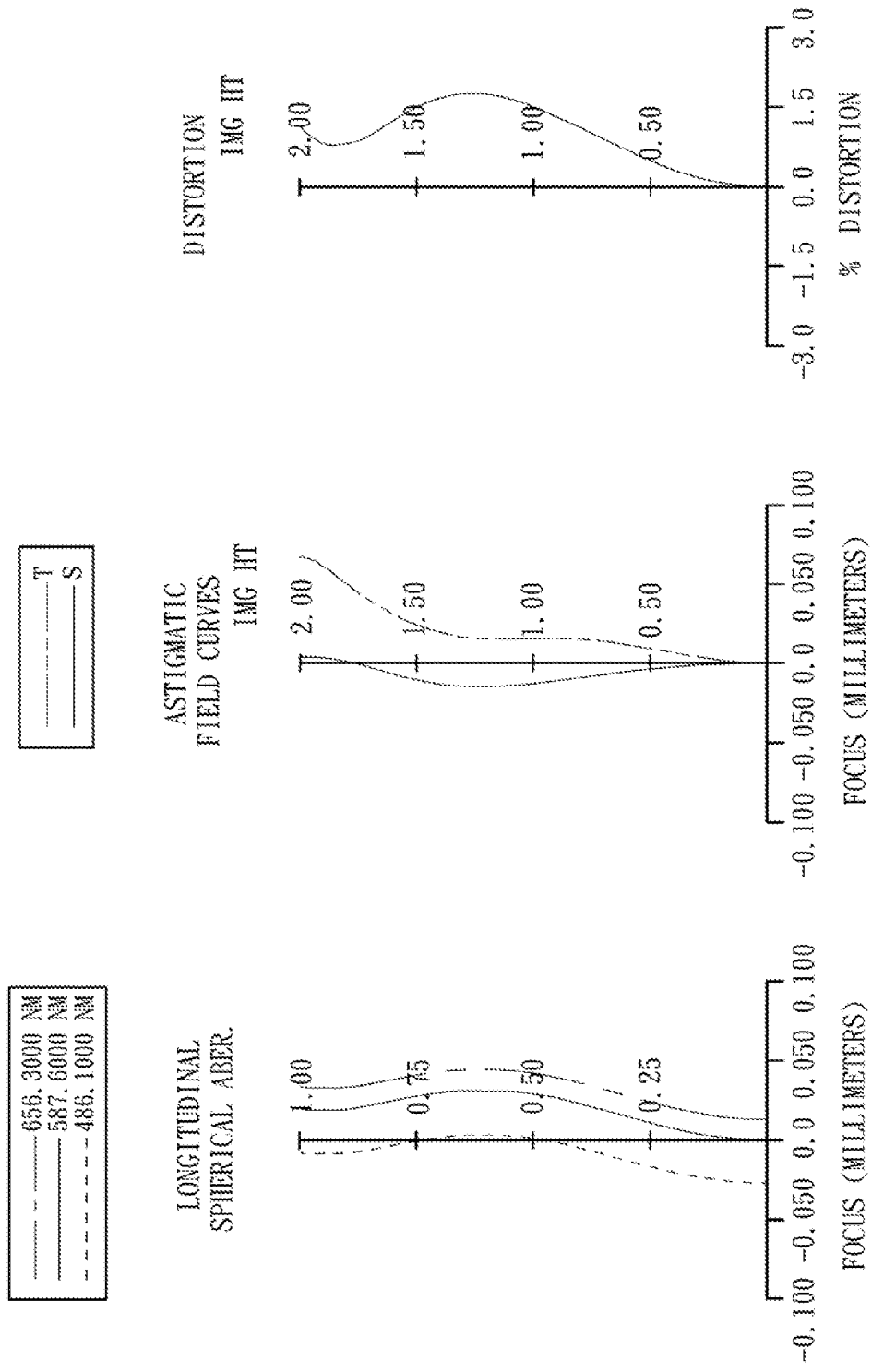
FIG. 8 shows spherical aberration curves, astigmatic field curves and a distortion curve of the optical image capturing lens system according to the 4th embodiment.

FIG. 7 is a schematic view of an optical image capturing lens system according to the 4th embodiment of the present disclosure. FIG. 8 shows spherical aberration curves, astigmatic field curves and a distortion curve of the optical image capturing lens system according to the 4th embodiment. In FIG. 7, the optical image capturing lens system includes, in order from an object side to an image side, a first lens element 410, an aperture stop 400, a second lens element 420, a third lens element 430, an IR-cut filter 450 and an image plane 440.

The first lens element 410 with positive refractive power has an object-side surface 411 being convex at a paraxial region and an image-side surface 412 being concave at a paraxial region. The first lens element 410 is made of plastic material, and has the object-side surface 411 and the image-side surface 412 being aspheric.

The second lens element 420 with positive refractive power has an object-side surface 421 being convex at a paraxial region and being concave at a peripheral region, and an image-side surface 422 being concave at a paraxial region. The second lens element 420 is made of plastic material, and has the object-side surface 421 and the image-side surface 422 being aspheric.

The third lens element 430 with negative refractive power has an object-side surface 431 being concave at a paraxial region, and an image-side surface 432 being concave at a paraxial region and being convex at a peripheral region. The third lens element 430 is made of plastic material, and has the object-side surface 431 and the image-side surface 432 being aspheric. Furthermore, an axial distance between the image-side surface 432 of the third lens element 430 and the image plane 440 is BID which decreases and then increases from the paraxial region to the peripheral region of the image-side surface 432 of the third lens element 430 (As shown in FIG. 19).

The IR-cut filter 450 is made of glass, and located between the third lens element 430 and the image plane 440, and will not affect the focal length of the to optical image capturing lens system.

The detailed optical data of the 4th embodiment are shown in Table 7 and the aspheric surface data are shown in Table 8 below.

TABLE 7

4th Embodiment
f = 3.39 mm, Fno = 3.20, HFOV = 30.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.330 (ASP) | 0.479 | Plastic | 1.544 | 55.9 | 3.68 |
| 2 | | 3.459 (ASP) | 0.068 | | | | |
| 3 | Ape. Stop | Plano | 0.412 | | | | |
| 4 | Lens 2 | 1.883 (ASP) | 0.343 | Plastic | 1.544 | 55.9 | 15.82 |
| 5 | | 2.255 (ASP) | 0.498 | | | | |
| 6 | Lens 3 | −26.478 (ASP) | 1.332 | Plastic | 1.650 | 21.4 | −6.32 |
| 7 | | 4.960 (ASP) | 0.346 | | | | |
| 8 | IR-cut filter | Plano | 0.200 | Glass | 1.517 | 64.2 | — |
| 9 | | Plano | 0.251 | | | | |
| 10 | Image | Plano | — | | | | |

Note:
Reference wavelength (d-line) is 587.6 nm.

TABLE 8

Aspheric Coefficients

| Surface # | 1 | 2 | 4 | 5 | 6 | 7 |
|---|---|---|---|---|---|---|
| k = | −7.9964E−01 | −4.6342E+00 | −9.9995E+00 | −1.7069E+01 | −1.0000E+00 | 4.9444E+00 |
| A4 = | −2.7344E−02 | −1.0744E−01 | −3.0675E−02 | 9.6717E−04 | −2.1056E−01 | −7.6176E−02 |
| A6 = | 5.8060E−02 | −7.3675E−02 | −1.6328E−02 | −4.2827E−02 | 3.0119E−02 | 5.4918E−03 |
| A8 = | −1.7236E−01 | −1.7570E−01 | −4.9876E−02 | −1.8919E−01 | −9.0110E−02 | −2.0761E−03 |
| A10 = | −3.5874E−01 | −1.4840E−01 | 2.2442E−01 | −5.1858E−02 | −3.4923E−02 | −3.2458E−04 |
| A12 = | 5.8377E−01 | 5.9782E−01 | −4.1652E−01 | −7.5675E−03 | 9.8558E−03 | 6.9000E−05 |
| A14 = | −5.6230E−02 | 4.1060E−01 | −1.2561E−01 | 9.7441E−02 | −3.4989E−02 | 2.8302E−05 |

In the optical image capturing lens system according to the 4th embodiment, the definitions off. Fno, HFOV, V1, V3, CT2, CT3, ET23, T23, BL, TL, R4, R5, f1, f2 and f3 are the same as those stated in the 1st embodiment with corresponding values for the 4th embodiment. Moreover, these parameters can be calculated from Table 7 and Table 8 as the following values and satisfy the following relationships:

| f (mm) | 3.39 | BL/TL | 0.203 |
|---|---|---|---|
| Fno | 3.20 | (R4 + R5)/(R4 − R5) | −0.84 |
| HFOV (deg.) | 30.1 | f/R5 | −0.13 |
| V1 − V3 | 34.5 | f/f2 | 0.22 |
| CT2/CT3 | 0.258 | (f/f1) + (f/f2) − (f/f3) | 1.68 |
| ET23/T23 | 0.56 | | |

5th Embodiment

Figure 9:
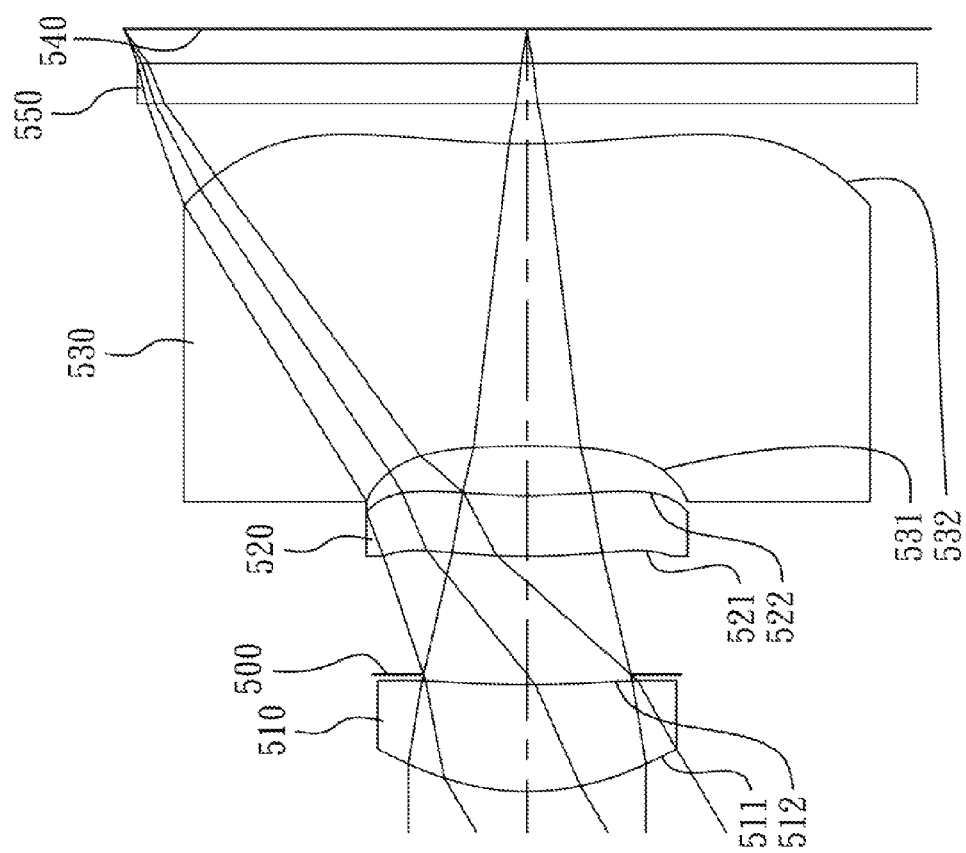
FIG. 9 is a schematic view of an optical image capturing lens system according to the 5th embodiment of the present disclosure.
Figure 10:
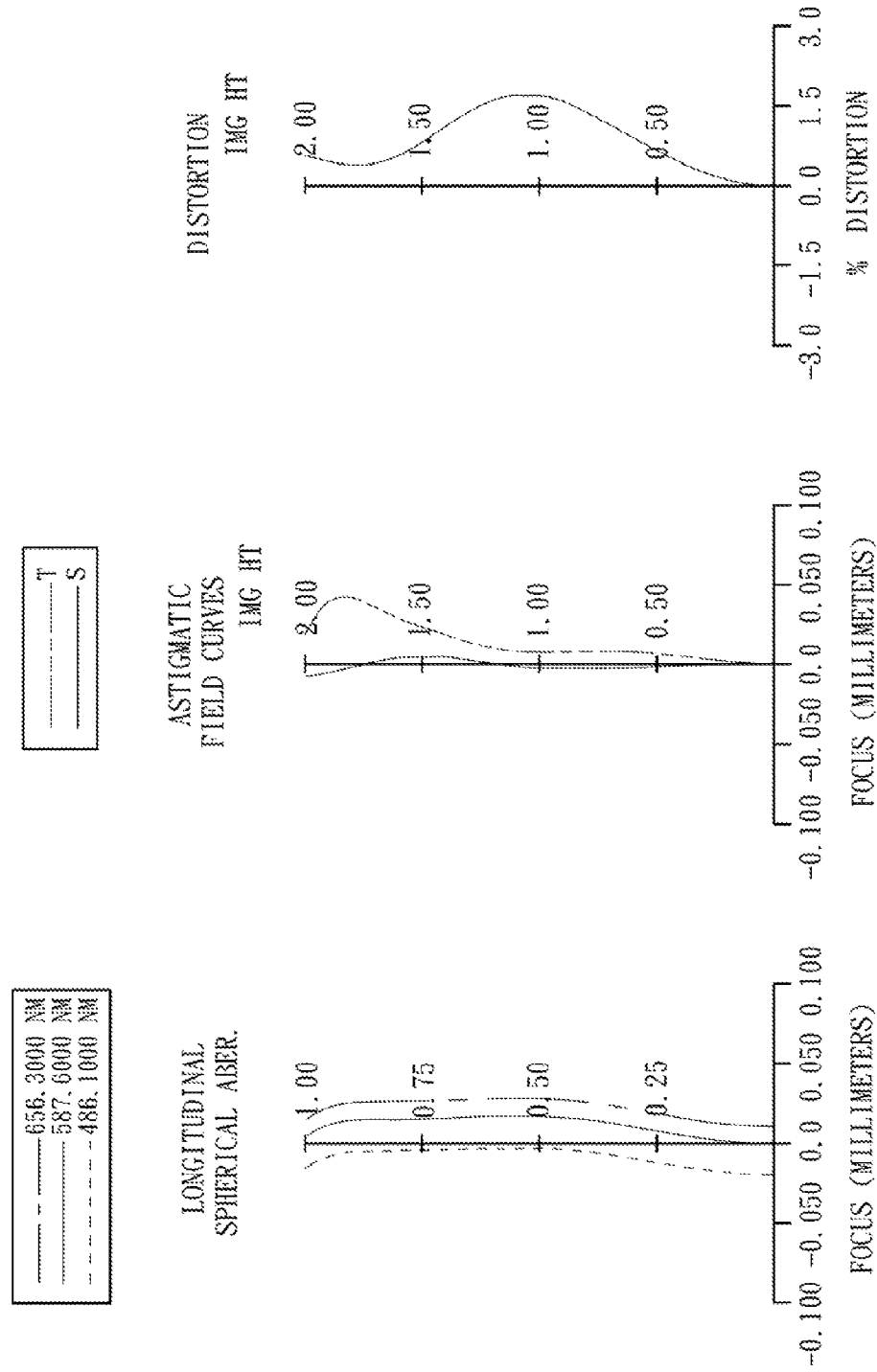
FIG. 10 shows spherical aberration curves, astigmatic field curves and a distortion curve of the optical image capturing lens system according to the 5th embodiment.

FIG. 9 is a schematic view of an optical image capturing lens system according to the 5th embodiment of the present disclosure. FIG. 10 shows spherical aberration curves, astigmatic field curves and a distortion curve of the optical image capturing lens system according to the 5th embodiment. In FIG. 9, the optical image capturing lens system includes, in order from an object side to an image side, a first lens element 510, an aperture stop 500, a second lens element 520, a third lens element 530, an IR-cut filter 550 and an image plane 540.

The first lens element 510 with positive refractive power has an object-side surface 511 being convex at a paraxial region and an image-side surface 512 being concave at a paraxial region. The first lens element 510 is made of glass material, and has the object-side surface 511 and the image-side surface 512 being aspheric.

The second lens element 520 with positive refractive power has an object-side surface 521 being convex at a paraxial region and being concave at a peripheral region, and an image-side surface 522 being concave at a paraxial region. The second lens element 520 is made of plastic material, and has the object-side surface 521 and the image-side surface 522 being aspheric.

The third lens element 530 with negative refractive power has an object-side surface 531 being concave at a paraxial region, and an image-side surface 532 being concave at a paraxial region and being convex at a peripheral region. The third lens element 530 is made of plastic material, and has the object-side surface 531 and the image-side surface 532 being aspheric. Furthermore, an axial distance between the image-side surface 532 of the third lens element 530 and the image plane 540 is BID which decreases and then increases from the paraxial region to the peripheral region of the image-side surface 532 of the third lens element 530 (As shown in FIG. 19).

The IR-cut filter 550 is made of glass, and located between the third lens element 530 and the image plane 540, and will not affect the focal length of the optical image capturing lens system.

The detailed optical data of the 5th embodiment are shown in Table 9 and the aspheric surface data are shown in Table 10 below.

TABLE 9

5th Embodiment
f = 3.30 mm, Fno = 2.80, HFOV = 31.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.285 (ASP) | 0.533 | Glass | 1.566 | 61.1 | 2.84 |
| 2 | | 5.487 (ASP) | 0.050 | | | | |
| 3 | Ape. Stop | Plano | 0.586 | | | | |
| 4 | Lens 2 | 2.963 (ASP) | 0.300 | Plastic | 1.544 | 55.9 | 332.05 |
| 5 | | 2.905 (ASP) | 0.246 | | | | |
| 6 | Lens 3 | −6.969 (ASP) | 1.500 | Plastic | 1.650 | 21.4 | −3.89 |
| 7 | | 4.301 (ASP) | 0.200 | | | | |
| 8 | IR-cut filter | Plano | 0.200 | Glass | 1.517 | 64.2 | — |
| 9 | | Plano | 0.171 | | | | |
| 10 | Image | Plano | — | | | | |

Note:
Reference wavelength (d-line) is 587.6 nm.

TABLE 10

Aspheric Coefficients

| Surface # | 1 | 2 | 4 | 5 | 6 | 7 |
|---|---|---|---|---|---|---|
| k = | −4.0889E−01 | 5.0000E+00 | −2.0000E+01 | −2.0000E+01 | 5.0000E+01 | 1.4798E+00 |
| A4 = | −1.6026E−02 | −5.5143E−02 | −1.9045E−01 | −3.1535E−01 | −3.4277E−01 | −7.5788E−02 |
| A6 = | 3.9549E−02 | −1.1392E−01 | 1.5140E−01 | 1.7695E−01 | −7.2008E−04 | −1.3851E−03 |
| A8 = | −1.8814E−01 | 1.4303E−02 | −5.5467E−01 | −2.4023E−01 | −4.4333E−01 | −1.5140E−03 |
| A10 = | −1.4624E−01 | 2.9690E−01 | 2.4210E−01 | −1.5992E−01 | 5.6095E−01 | 9.6256E−05 |
| A12 = | 8.3796E−01 | −1.2189E+00 | 7.8006E−02 | −1.8752E−01 | 3.0095E−01 | 3.1423E−04 |
| A14 = | −9.0424E−01 | 3.8979E−01 | −1.4776E+00 | −4.4441E−01 | −2.0510E+00 | −6.5898E−05 |

In the optical image capturing lens system according to the 5th embodiment, the definitions of f, Fno, HFOV, V1, V3, CT2, CT3, ET23, T23, BL, TL, R4, R5, f1, f2 and f3 are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 3.30 | BL/TL | 0.151 |
| Fno | 2.80 | (R4 + R5)/(R4 − R5) | −0.41 |
| HFOV (deg.) | 31.0 | f/R5 | −0.47 |
| V1 − V3 | 39.7 | f/f2 | 0.01 |
| CT2/CT3 | 0.200 | (f/f1) + (f/f2) − (f/f3) | 2.02 |
| ET23/T23 | 0.21 | | |

6th Embodiment

Figure 11:
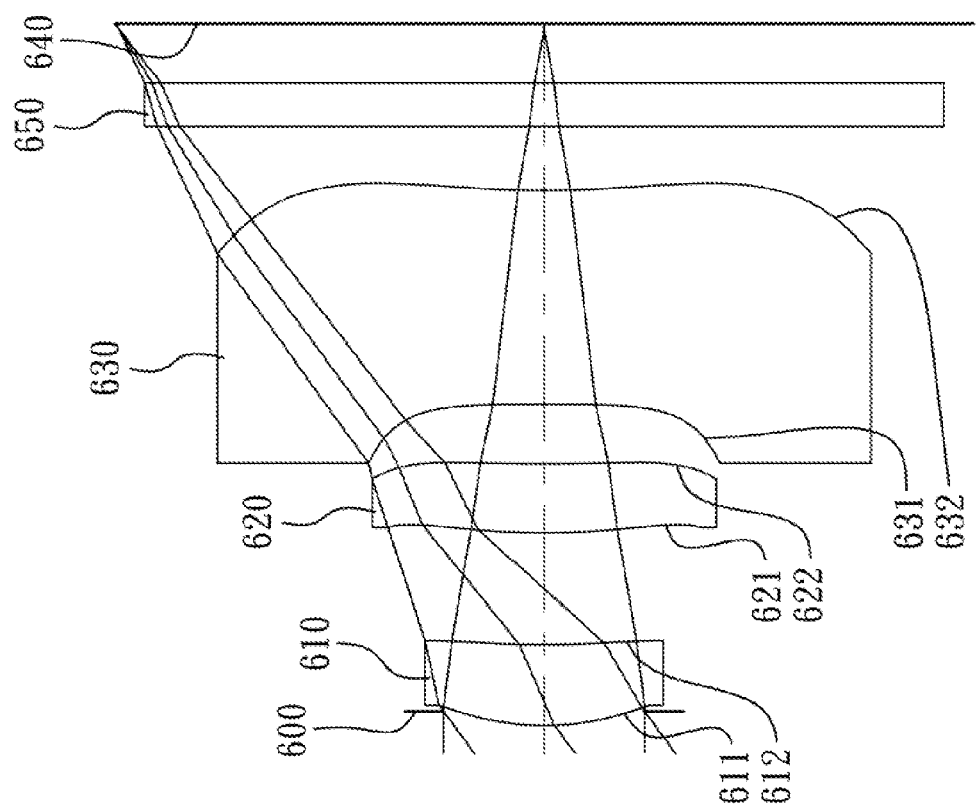
FIG. 11 is a schematic view of an optical image capturing lens system to according to the 6th embodiment of the present disclosure.
Figure 12:
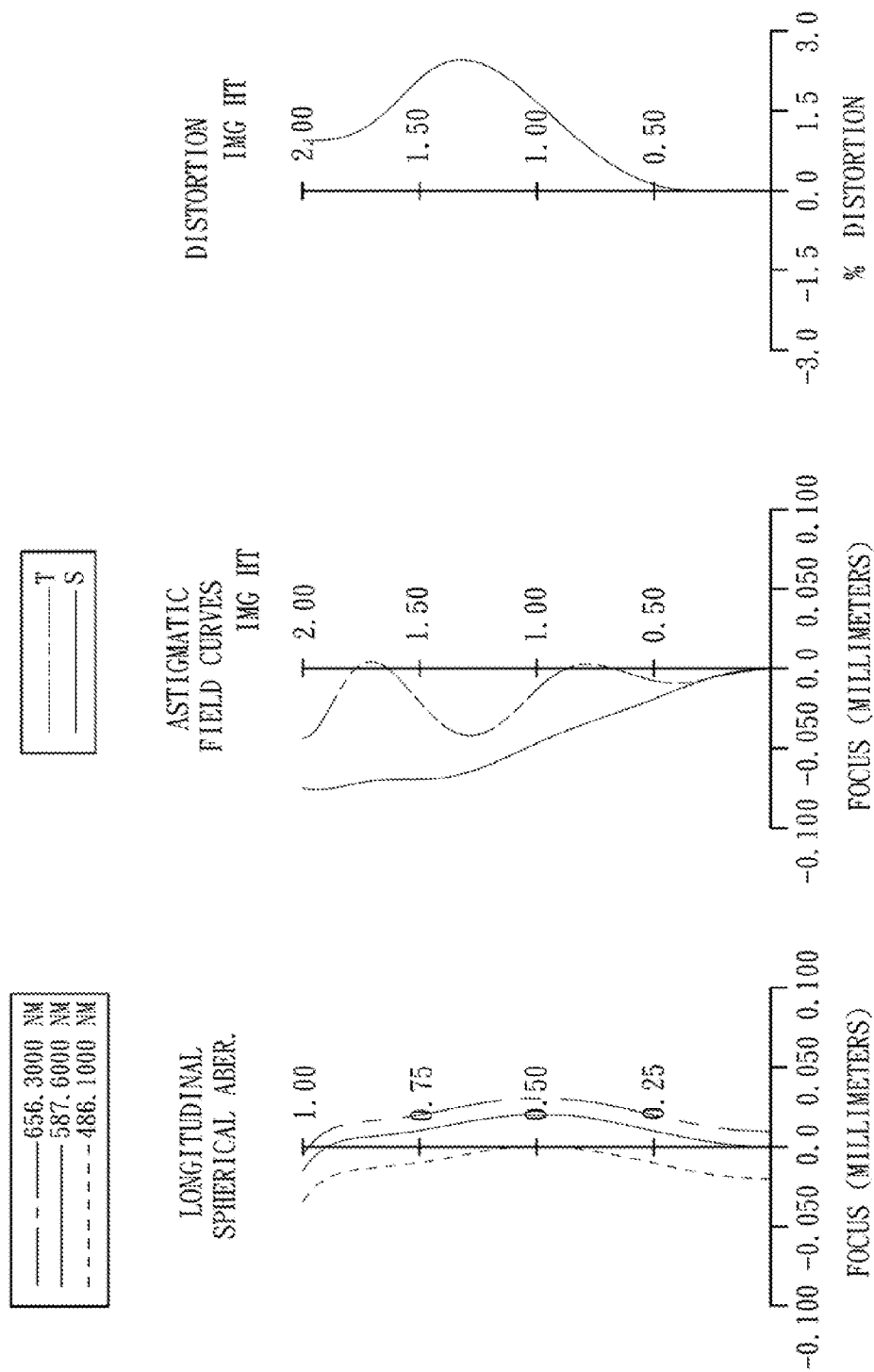
FIG. 12 shows spherical aberration curves, astigmatic field curves and a distortion curve of the optical image capturing lens system according to the 6th embodiment.

FIG. 11 is a schematic view of an optical image capturing lens system according to the 6th embodiment of the present disclosure. FIG. 12 shows spherical aberration curves, astigmatic field curves and a distortion curve of the optical image capturing lens system according to the 6th embodiment. In FIG. 11, the optical image capturing lens system includes, in order from an object side to an image side, an aperture stop 600, a first lens element 610, a second lens element 620, a third lens element 630, an IR-cut filter 650 and an image plane 640.

The first lens element 610 with positive refractive power has an object-side surface 611 being convex at a paraxial region and an image-side surface 612 being concave at a paraxial region. The first lens element 610 is made of plastic material, and has the object-side surface 611 and the image-side surface 612 being aspheric.

The second lens element 620 with positive refractive power has an object-side surface 621 being convex at a paraxial region and being concave at a peripheral region, and an image-side surface 622 being concave at a paraxial region. The second lens element 620 is made of plastic material, and has the object-side surface 621 and the image-side surface 622 being aspheric.

The third lens element 630 with negative refractive power has an object-side surface 631 being concave at a paraxial region, and an image-side surface 632 being concave at a paraxial region and being convex at a peripheral region. The third lens element 630 is made of plastic material, and has the object-side surface 631 and the image-side surface 632 being aspheric. Furthermore, an axial distance between the image-side surface 632 of the third lens element 630 and the image plane 640 is BID which decreases and then increases from the paraxial region to the peripheral region of the image-side surface 632 of the third lens element 630 (As shown in FIG. 19).

The IR-cut filter 650 is made of glass, and located between the third lens element 630 and the image plane 640, and will not affect the focal length of the optical image capturing lens system.

The detailed optical data of the 6th embodiment are shown in Table 11 and the aspheric surface data are shown in Table 12 below.

TABLE 11

6th Embodiment
f = 2.70 mm, Fno = 2.87, HFOV = 36.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.065 | | | | |
| 2 | Lens 1 | 1.256 (ASP) | 0.378 | Plastic | 1.544 | 56.1 | 2.98 |
| 3 | | 4.965 (ASP) | 0.522 | | | | |
| 4 | Lens 2 | 3.476 (ASP) | 0.320 | Plastic | 1.544 | 56.1 | 9.54 |
| 5 | | 10.186 (ASP) | 0.230 | | | | |
| 6 | Lens 3 | −105.064 (ASP) | 1.000 | Plastic | 1.650 | 21.4 | −6.19 |
| 7 | | 4.199 (ASP) | 0.300 | | | | |
| 8 | IR-cut filter | Plano | 0.200 | Glass | 1.517 | 64.2 | — |
| 9 | | Plano | 0.280 | | | | |
| 10 | Image | Plano | — | | | | |

Note:
Reference wavelength (d-line) is 587.6 nm.

TABLE 12

Aspheric Coefficients

| Surface # | 2 | 3 | 4 | 5 | 6 | 7 |
|---|---|---|---|---|---|---|
| k = | −4.4184E−01 | 3.9177E+00 | 6.1959E+00 | 1.0000E+02 | 1.0000E+02 | 3.3449E+00 |
| A4 = | −5.8952E−02 | −4.6993E−02 | −6.4678E−02 | −7.0414E−02 | −2.5585E−01 | −1.3943E−01 |
| A6 = | 2.1439E−01 | −4.9807E−01 | 1.6657E−01 | −1.9994E−01 | −4.9502E−01 | 6.1331E−02 |
| A8 = | −7.9876E−01 | 1.6468E+00 | −1.8297E+00 | −3.0828E−01 | 9.3445E−01 | −3.6062E−02 |
| A10 = | −1.0205E+00 | −4.8727E+00 | 2.1445E+00 | 2.7142E−01 | −6.6116E−01 | 5.5107E−04 |
| A12 = | −3.3384E+00 | 1.8003E+00 | 2.2366E+00 | −6.3452E−01 | −3.2966E+00 | 4.6376E−03 |
| A14 = | 2.6328E+01 | 6.5487E+00 | −5.0333E+00 | 9.1165E−01 | 3.1644E+00 | −9.8422E−04 |

In the optical image capturing lens system according to the 6th embodiment, the definitions of f, Fno, HFOV, V1, V3, CT2, CT3, ET23, T23, BL, TL, R4, R5, f1, f2 and f3 are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 2.70 | BL/TL | 0.238 |
| Fno | 2.87 | (R4 + R5)/(R4 − R5) | −0.82 |
| HFOV (deg.) | 36.2 | f/R5 | −0.03 |
| V1 − V3 | 34.7 | f/f2 | 0.28 |
| CT2/CT3 | 0.320 | (f/f1) + (f/f2) − (f/f3) | 1.62 |
| ET23/T23 | 0.26 | | |

7th Embodiment

Figure 13:
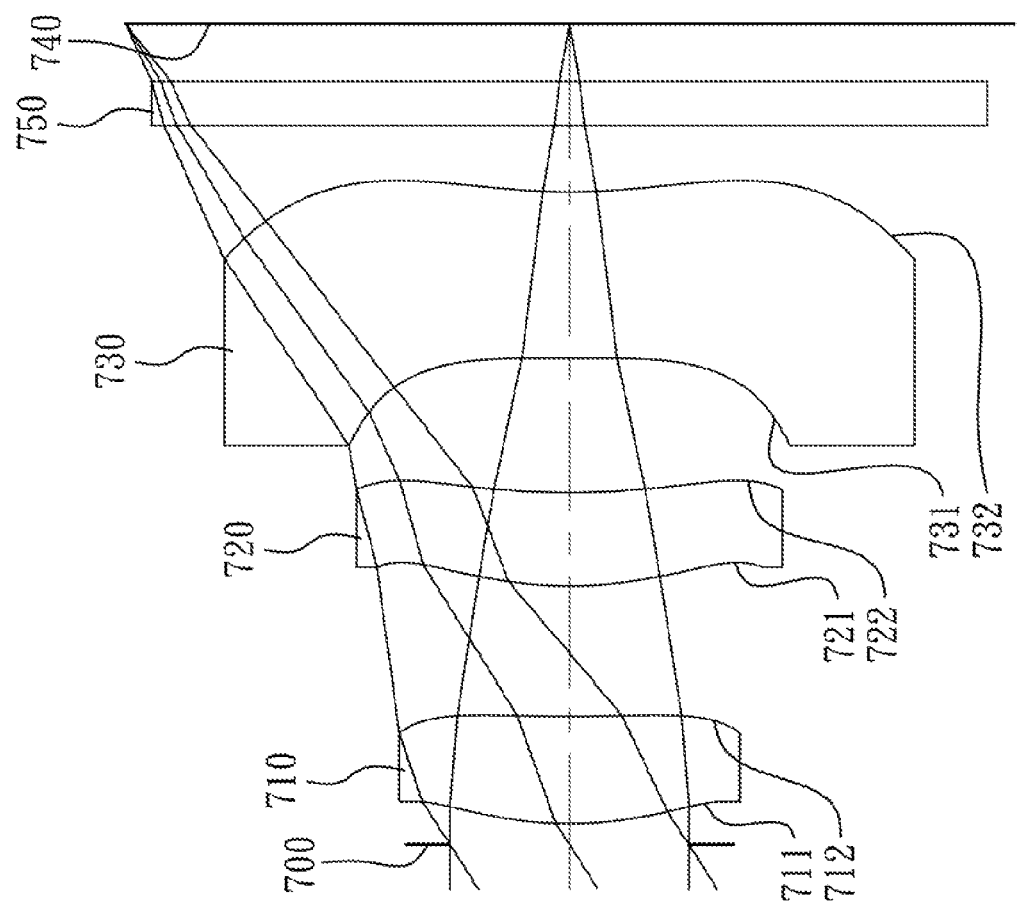
FIG. 13 is a schematic view of an optical image capturing lens system according to the 7th embodiment of the present disclosure.
Figure 14:
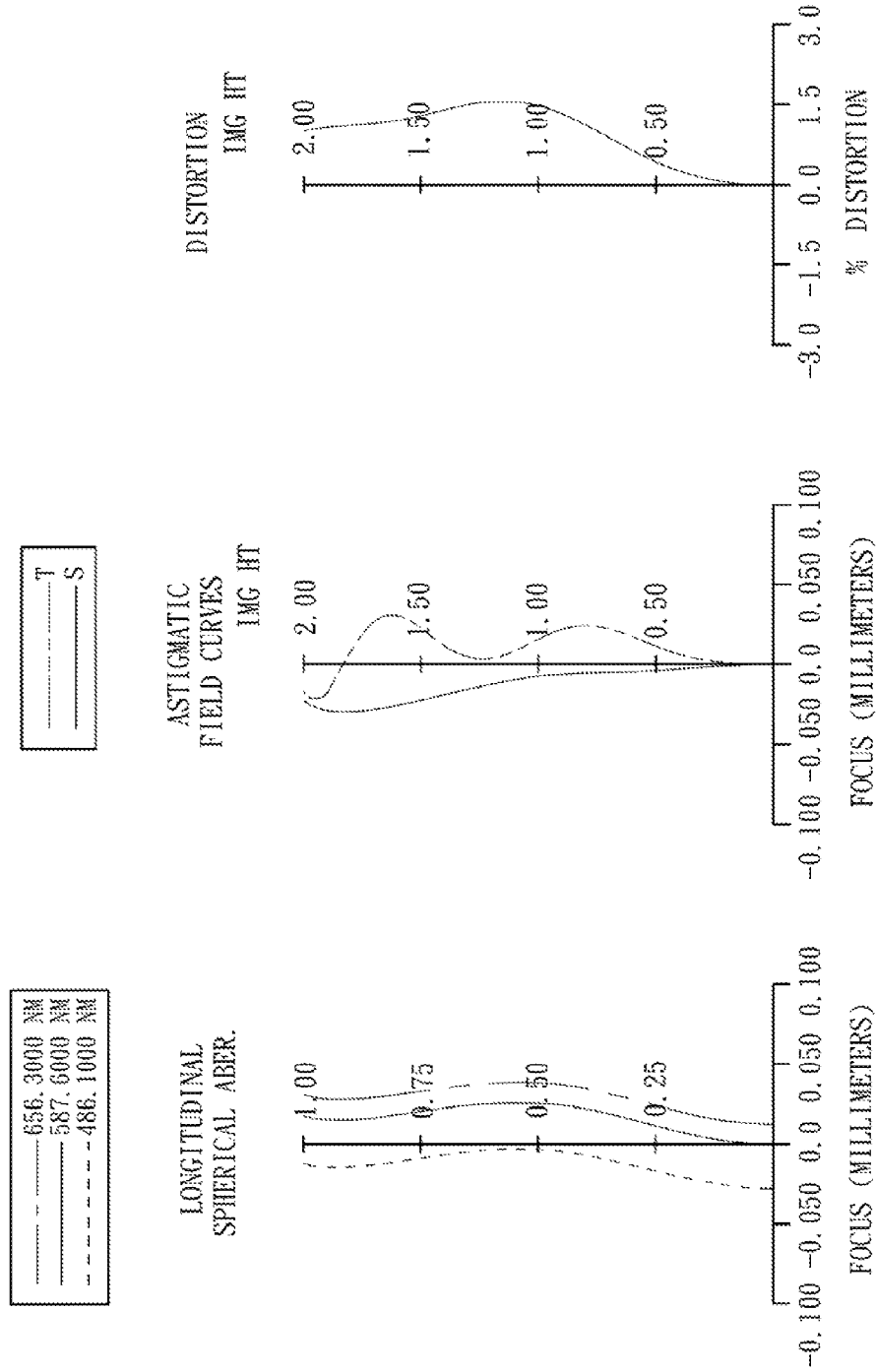
FIG. 14 shows spherical aberration curves, astigmatic field curves and a distortion curve of the optical image capturing lens system according to the 7th embodiment.

FIG. 13 is a schematic view of an optical image capturing lens system according to the 7th embodiment of the present disclosure. FIG. 14 shows spherical aberration curves, astigmatic field curves and a distortion curve of the optical image capturing lens system according to the 7th embodiment. In FIG. 13, the optical image capturing lens system includes, in order from an object side to an image side, an aperture stop 700, a first lens element 710, a second lens element 720, a third lens element 730, an IR-cut filter 750 and an image plane 740.

The first lens element 710 with positive refractive power has an object-side surface 711 being convex at a paraxial region and an image-side surface 712 being concave at a paraxial region. The first lens element 710 is made of plastic material, and has the object-side surface 711 and the image-side surface 712 being aspheric.

The second lens element 720 with positive refractive power has an object-side surface 721 being convex at a paraxial region and being concave at a peripheral region, and an image-side surface 722 being concave at a paraxial region. The second lens element 720 is made of plastic material, and has the object-side surface 721 and the image-side surface 722 being aspheric.

The third lens element 730 with negative refractive power has an object-side surface 731 being planar at a paraxial region, and an image-side surface 732 being concave at a paraxial region and being convex at a peripheral region. The third lens element 730 is made of plastic material, and has the object-side surface 731 and the image-side surface 732 being aspheric. Furthermore, an axial distance between the image-side surface 732 of the third lens element 730 and the image plane 740 is BID which decreases and then increases from the paraxial region to the peripheral region of the image-side surface 732 of the third lens element 730 (As shown in FIG. 19).

The IR-cut filter 750 is made of glass, and located between the third lens element 730 and the image plane 740, and will not affect the focal length of the optical image capturing lens system.

The detailed optical data of the 7th embodiment are shown in Table 13 and the aspheric surface data are shown in Table 14 below.

TABLE 13

7th Embodiment
f = 3.09 mm, Fno = 2.87, HFOV = 32.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | 0.097 | | | | |
| 2 | Lens 1 | 1.676 | (ASP) | 0.484 | Plastic | 1.535 | 56.3 | 3.95 |
| 3 | | 7.322 | (ASP) | 0.589 | | | | |
| 4 | Lens 2 | 1.804 | (ASP) | 0.420 | Plastic | 1.544 | 55.9 | 6.70 |
| 5 | | 3.279 | (ASP) | 0.607 | | | | |
| 6 | Lens 3 | ∞ | (ASP) | 0.750 | Plastic | 1.633 | 23.4 | −4.11 |
| 7 | | 2.602 | (ASP) | 0.300 | | | | |
| 8 | IR-cut filter | Plano | | 0.200 | Glass | 1.517 | 64.2 | — |
| 9 | | Plano | | 0.260 | | | | |
| 10 | Image | Plano | | — | | | | |

Note:
Reference wavelength (d-line) is 587.6 nm.

TABLE 14

Aspheric Coefficients

| Surface # | 2 | 3 | 4 | 5 | 6 | 7 |
|---|---|---|---|---|---|---|
| k = | −1.9942E+00 | −4.4999E+00 | −3.3878E+00 | −1.5313E+01 | 5.0000E+00 | −2.7945E−01 |
| A4 = | −6.8476E−02 | −1.7807E−01 | −8.0334E−02 | −3.6872E−02 | −2.9643E−01 | −2.1987E−01 |
| A6 = | 7.2091E−03 | −2.9507E−01 | 2.5148E−01 | 1.0189E−01 | −1.2573E−01 | 7.6187E−02 |
| A8 = | −3.3498E−01 | 9.6749E−01 | −1.0958E+00 | −3.3314E−01 | 1.4794E−01 | −2.3687E−02 |
| A10 = | −4.0426E−01 | −3.1999E+00 | 1.6031E+00 | 1.7742E−01 | 1.3231E−01 | −5.3058E−04 |
| A12 = | 2.5419E+00 | 4.5143E+00 | −1.3298E+00 | −9.6023E−02 | −5.5323E−01 | 2.1701E−03 |
| A14 = | −4.4468E+00 | −2.8657E+00 | 3.1382E−01 | 6.1661E−02 | 2.8940E−01 | −3.5596E−04 |

In the optical image capturing lens system according to the 7th embodiment, the definitions of f, Fno, HFOV, V1, V3, CT2, CT3, ET23, T23, BL, TL, R4, R5, f1, f2 and f3 are the same as those stated in the 1st embodiment with corresponding values for the 7th embodiment. Moreover, these parameters can be calculated from Table 3 and Table 14 as the following values and satisfy the following relationships:

| | | | |
|---|---|---|---|
| f (mm) | 3.09 | BL/TL | 0.211 |
| Fno | 2.87 | (R4 + R5)/(R4 − R5) | −1.00 |
| HFOV (deg.) | 32.5 | f/R5 | 0.00 |
| V1 − V3 | 32.9 | f/f2 | 0.46 |
| CT2/CT3 | 0.560 | (f/f1) + (f/f2) − (f/f3) | 1.99 |
| ET23/T23 | 0.33 | | |

8th Embodiment

Figure 15:
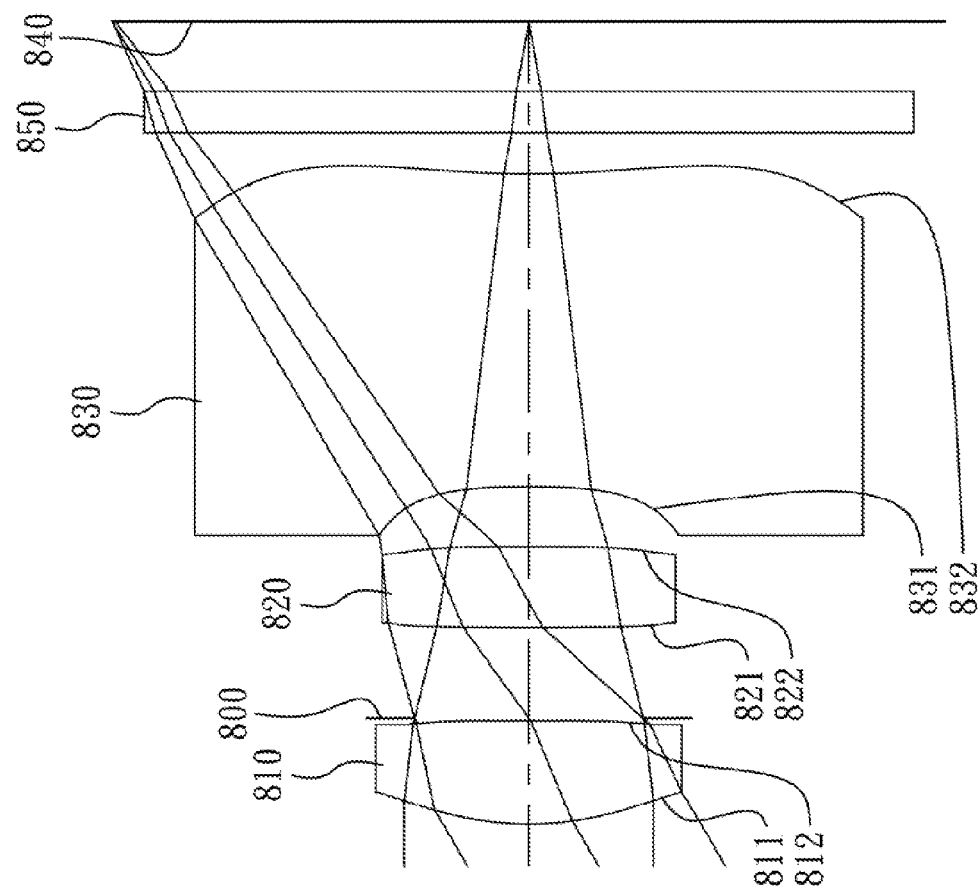
FIG. 15 is a schematic view of an optical image capturing lens system according to the 8th embodiment of the present disclosure.
Figure 16:
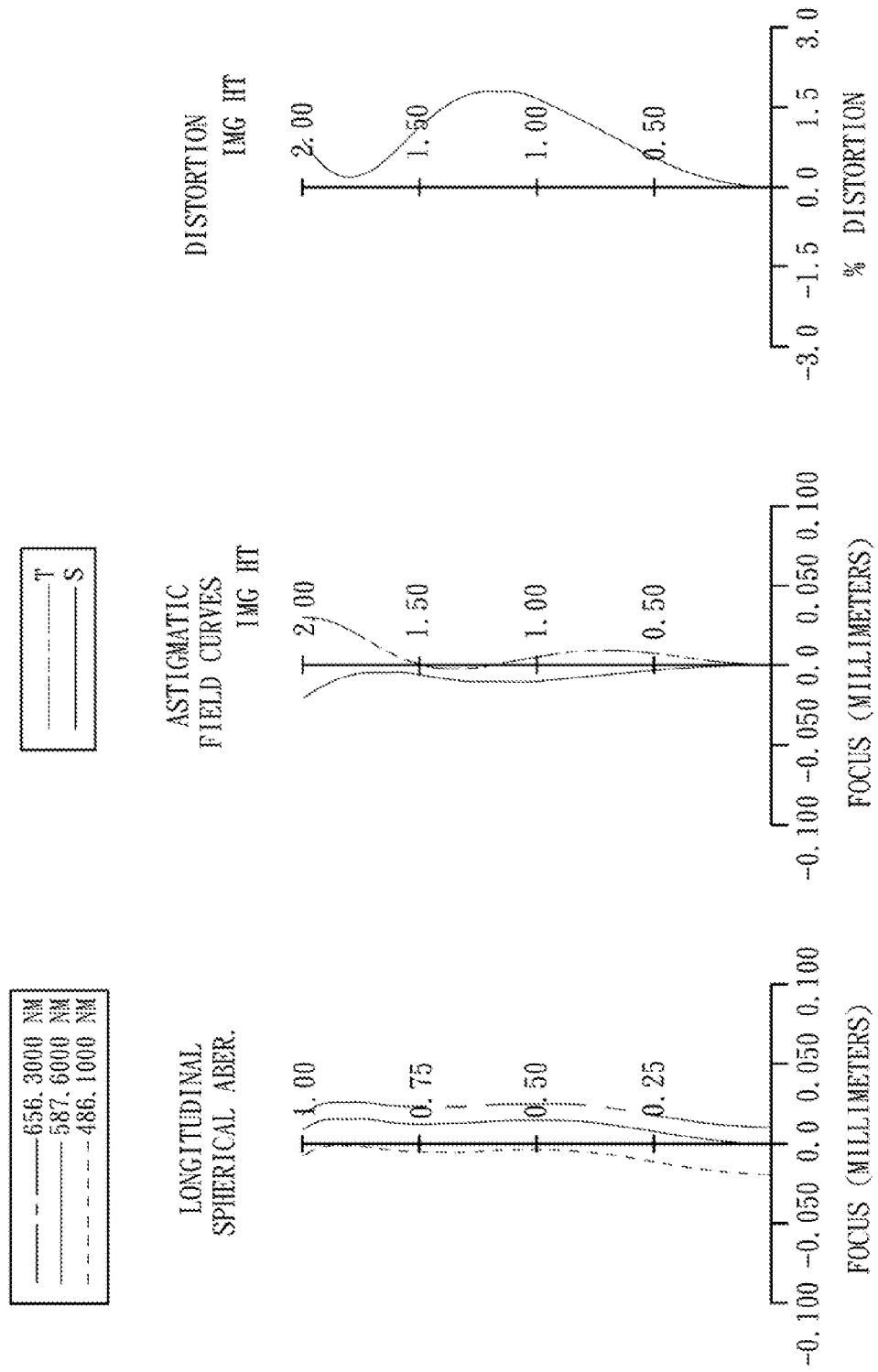
FIG. 16 shows spherical aberration curves, astigmatic field curves and a distortion curve of the optical image capturing lens system according to the 8th embodiment.

FIG. 15 is a schematic view of an optical image capturing lens system according to the 8th embodiment of the present disclosure. FIG. 16 shows spherical aberration curves, astigmatic field curves and a distortion curve of the optical image capturing lens system according to the 8th embodiment. In FIG. 15, the optical image capturing lens system includes, in order from an object side to an image side, a first lens element 810 an aperture stop 800, a second lens element 820, a third lens element 830, an IR-cut filter 850 and an image plane 840.

The first lens element 810 with positive refractive power has an object-side surface 811 being convex at a paraxial region and an image-side surface 812 being convex at a paraxial region. The first lens element 810 is made of plastic material, and has the object-side surface 811 and the image-side surface 812 being aspheric.

The second lens element 820 with positive refractive power has an object-side surface 821 being convex at a paraxial region and an image-side surface 822 being concave at a paraxial region. The second lens element 820 is made of plastic material, and has the object-side surface 821 and the image-side surface 822 being aspheric.

The third lens element 830 with negative refractive power has an object-side surface 831 being concave at a paraxial region, and an image-side surface 832 being concave at a paraxial region and being convex at a peripheral region. The third lens element 830 is made of plastic material, and has the object-side surface 831 and the image-side surface 832 being aspheric. Furthermore, an axial distance between the image-side surface 832 of the third lens element 830 and the image plane 840 is BID which decreases and then increases from the paraxial region to the peripheral region of the image-side surface 832 of the third lens element 830 (As shown in FIG. 19).

The IR-cut filter 850 is made of glass, and located between the third lens element 830 and the image plane 840, and will not affect the focal length of the optical image capturing lens system.

The detailed optical data of the 8th embodiment are shown in Table 15 and the aspheric surface data are shown in Table 16 below.

TABLE 15

8th Embodiment
f = 3.35 mm, Fno = 2.80, HFOV = 30.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.464 (ASP) | 0.499 | Plastic | 1.543 | 56.5 | 2.65 |
| 2 | | −79.745 (ASP) | 0.013 | | | | |
| 3 | Ape. Stop | Plano | 0.432 | | | | |
| 4 | Lens 2 | 13.261 (ASP) | 0.391 | Plastic | 1.544 | 55.9 | 29.94 |
| 5 | | 70.527 (ASP) | 0.290 | | | | |
| 6 | Lens 3 | −4.290 (ASP) | 1.500 | Plastic | 1.650 | 21.4 | −3.16 |
| 7 | | 4.471 (ASP) | 0.200 | | | | |
| 8 | IR-cut filter | Plano | 0.200 | Glass | 1.517 | 84.2 | — |
| 9 | | Plano | 0.334 | | | | |
| 10 | Image | Plano | — | | | | |

Note:
Reference wavelength (d-line) is 587.6 nm.

TABLE 16

Aspheric Coefficients

| Surface # | 1 | 2 | 4 | 5 | 6 | 7 |
|---|---|---|---|---|---|---|
| k = | −7.0490E−01 | −2.0000E+01 | 1.5682E+01 | −1.0000E+00 | 1.1553E+01 | 1.3671E+00 |
| A4 = | −4.9601E−02 | −1.0625E−01 | −1.1456E−01 | −2.8934E−01 | −4.2110E−01 | −9.2427E−02 |
| A6 = | −4.3469E−03 | −1.1199E−01 | 3.0320E−01 | 1.9898E−01 | −7.2147E−02 | 1.8229E−02 |
| A8 = | −2.0999E−01 | 7.6996E−02 | −4.8995E−01 | −2.5946E−02 | −4.4764E−01 | −8.7512E−03 |
| A10 = | −1.8715E−01 | 3.1621E−01 | 1.0514E+00 | −1.8323E−01 | −4.0287E−02 | 4.9605E−04 |
| A12 = | 9.3782E−01 | −1.1498E+00 | 1.4222E+00 | −2.9482E−01 | −1.4102E+00 | 5.4140E−04 |
| A14 = | −9.3266E−01 | 7.7177E−01 | −2.5830E+00 | 2.7251E+00 | 1.1844E+00 | −7.3623E−05 |

In the optical image capturing lens system according to the 8th embodiment, the definitions of f, Fno, HFOV, V1, V3, CT2, CT3, ET23, T23, BL, TL, R4, R5, f1, f2 and f3 are the same as those stated in the 1st embodiment with corresponding values for the 8th embodiment. Moreover, these parameters can be calculated from Table 15 and Table 16 as the following values and satisfy the following relationships:

| f (mm) | 3.35 | BL/TL | 0.190 |
|---|---|---|---|
| Fno | 2.80 | (R4 + R5)/(R4 − R5) | 0.89 |
| HFOV (deg.) | 30.5 | f/R5 | −0.78 |
| V1 − V3 | 35.1 | f/f2 | 0.11 |
| CT2/CT3 | 0.261 | (f/f1) + (f/f2) − (f/f3) | 2.44 |
| ET23/T23 | 0.30 | | |

9th Embodiment

Figure 17:
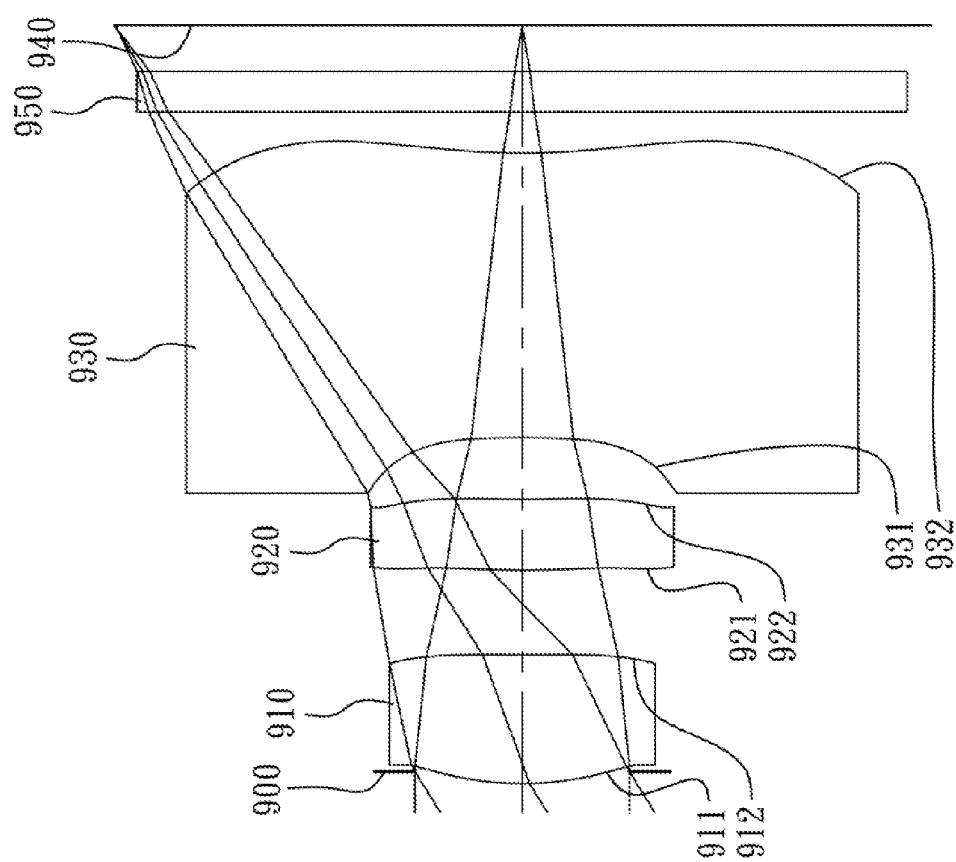
FIG. 17 is a schematic view of an optical image capturing lens system according to the 9th embodiment of the present disclosure.
Figure 18:
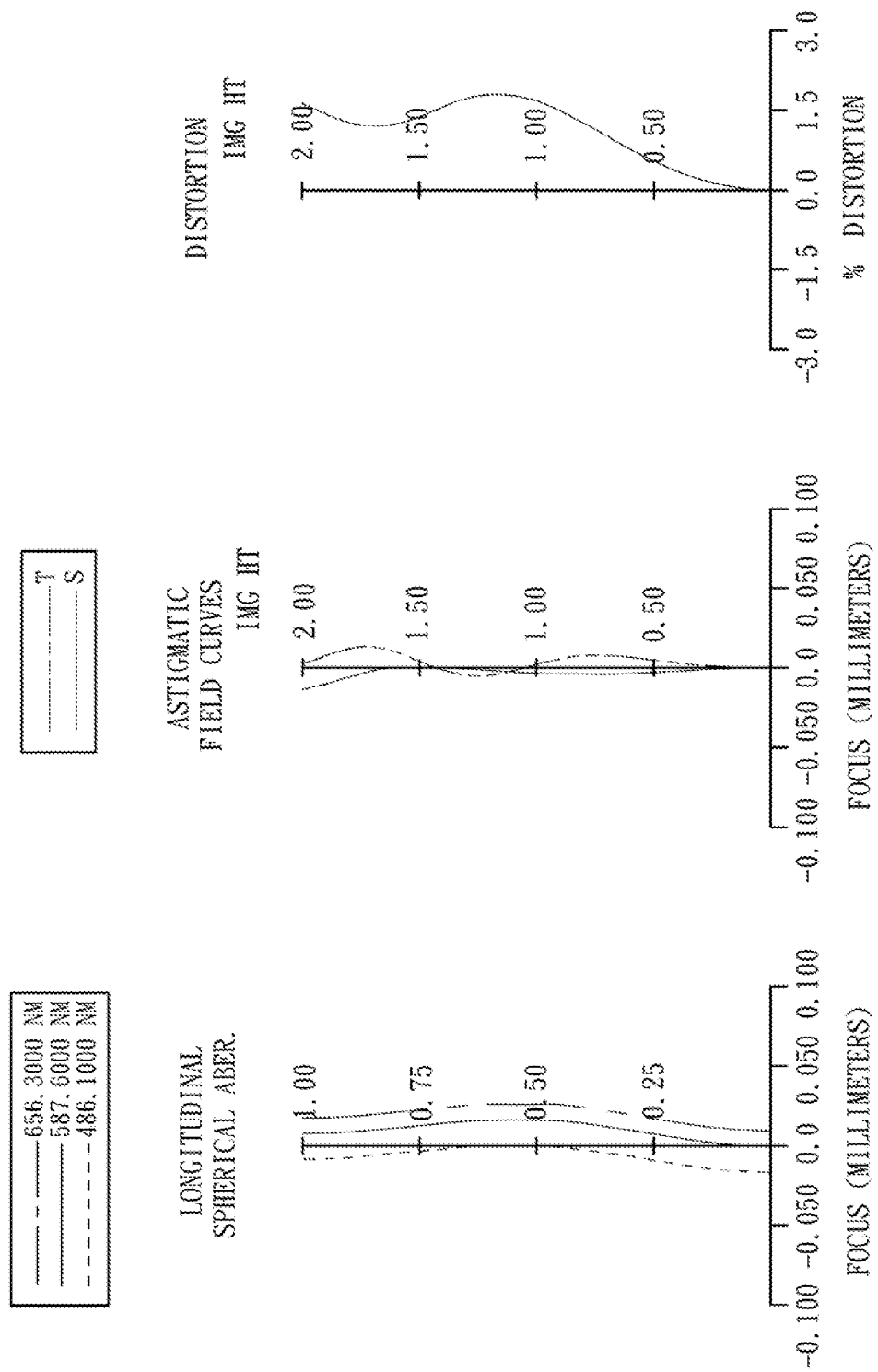
FIG. 18 shows spherical aberration curves, astigmatic field curves and a distortion curve of the optical image capturing lens system according to the 9th embodiment.

FIG. 17 is a schematic view of an optical image capturing lens system according to the 9th embodiment of the present disclosure. FIG. 18 shows spherical aberration curves, astigmatic field curves and a distortion curve of the optical image capturing lens system according to the 9th embodiment. In FIG. 17, the optical image capturing lens system includes, in order from an object side to an image side, an aperture stop 900, a first lens element 910, a second lens element 920, a third lens element 930, an IR-cut filter 950 and an image plane 940.

The first lens element 910 with positive refractive power has an object-side surface 911 being convex at a paraxial region and an image-side surface 912 being convex at a paraxial region. The first lens element 910 is made of glass material, and has the object-side surface 911 and the image-side surface 912 being aspheric.

The second lens element 920 with positive refractive power has an object-side surface 921 being convex at a paraxial region and being concave at a peripheral region, and an image-side surface 922 being concave at a paraxial region. The second lens element 920 is made of plastic material, and has the object-side surface 921 and the image-side surface 922 being aspheric.

The third lens element 930 with negative refractive power has an object-side surface 931 being concave at a paraxial region, and an image-side surface 932 being concave at a paraxial region and being convex at a peripheral region. The third lens element 930 is made of plastic material, and has the object-side surface 931 and the image-side surface 932 being aspheric. Furthermore, an axial distance between the image-side surface 932 of the third lens element 930 and the image plane 940 is BID which decreases and then increases from the paraxial region to the peripheral region of the image-side surface 932 of the third lens element 930 (As shown in FIG. 19).

The IR-cut filter 950 is made of glass, and located between the third lens element 930 and the image plane 940, and will not affect the focal length of the optical image capturing lens system.

The detailed optical data of the 9th embodiment are shown in Table 17 and the aspheric surface data are shown in Table 18 below.

TABLE 17

9th Embodiment
f = 3.16 mm, Fno = 3.00, HFOV = 31.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.057 | | | | |
| 2 | Lens 1 | 1.584 (ASP) | 0.633 | Glass | 1.587 | 59.6 | 2.65 |
| 3 | | −79.745 (ASP) | 0.412 | | | | |
| 4 | Lens 2 | 4.931 (ASP) | 0.350 | Plastic | 1.544 | 55.9 | 28.20 |
| 5 | | 7.084 (ASP) | 0.301 | | | | |
| 8 | Lens 3 | −5.269 (ASP) | 1.400 | Plastic | 1.650 | 21.4 | −3.00 |
| 7 | | 3.410 (ASP) | 0.200 | | | | |
| 8 | IR-cut filter | Plano | 0.200 | Glass | 1.517 | 64.2 | — |
| 9 | | Plano | 0.227 | | | | |
| 10 | Image | Plano | — | | | | |

Note:
Reference wavelength (d-line) is 587.6 nm.

TABLE 18

Aspheric Coefficients

| Surface # | 2 | 3 | 4 | 5 | 6 | 7 |
|---|---|---|---|---|---|---|
| k = | −1.6285E+00 | 2.0000E+01 | −2.0000E+01 | −1.0000E+00 | 2.4473E+01 | −4.6007E+00 |
| A4 = | −3.7199E−02 | −18677E−01 | −3.0897E−01 | −4.2959E−01 | −4.1129E−01 | −9.4684E−02 |
| A6 = | 3.8182E−02 | −8.8990E−02 | 4.2846E−01 | 9.9476E−02 | −2.8322E−01 | 2.0055E−02 |
| A8 = | −5.0473E−01 | −1.4701E−01 | −1.2898E+00 | 2.2478E−01 | −1.5663E−01 | −7.1270E−03 |
| A10 = | 1.8768E−01 | 5.5741E−01 | 1.4903E+00 | −2.5384E−01 | 1.1868E+00 | −1.0267E−04 |
| A12 = | 2.0424E+00 | −1.4186E−01 | 3.9639E+00 | −9.7488E−01 | −4.5016E+00 | 8.3840E−04 |
| A14 = | −3.6316E+00 | −1.0473E+00 | −5.2536E+00 | 3.7138E+00 | 4.2203E+00 | −1.5777E−04 |

In the optical image capturing lens system according to the 9th embodiment, the definitions of f, Fno HFOV, V1, V3, CT2, CT3, ET23, T23, BL, TL, R4, R5, f1, f2 and f3 are the same as those stated in the 1st embodiment with corresponding values for the 9th embodiment. Moreover, these parameters can be calculated from Table 17 and Table 1 as the following values and satisfy the following relationships:

| f (mm) | 3.16 | BL/TL | 0 |
|---|---|---|---|
| Fno | 3.00 | (R4 + R5)/(R4 − R5) | 0.15 |
| HFOV (deg.) | 31.9 | f/R5 | −0.60 |
| V1 − V3 | 38.2 | f/f2 | 0.11 |
| CT2/CT3 | 0.250 | (f/f1) + (f/f2) − (f/f3) | 2.35 |
| ET23/T23 | 0.22 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image capturing lens system comprising, in order from an object side to an image side:
a first lens element with positive refractive power having an object de surface being convex at a paraxial region;
a second lens element with positive refractive power made of plastic material, and having an object-side surface being convex at a paraxial region and an image-side surface being concave at a paraxial region, wherein the object-side surface and the image-side surface of the second lens element are aspheric; and
a third lens element with negative refractive power made of plastic material, and having an object-side surface being concave or planar at a paraxial region and an image-side surface being concave at a paraxial region and being convex at a peripheral region, wherein the object-side surface and the image-side surface of the third lens element are aspheric;
wherein a curvature radius of the image-side surface of the second lens element is R4, a curvature radius of the object-side surface of the third lens element is R5, and the following relationship is satisfied:

$-1.0 \leq (R4+R5)/(R4-R5) < 1.0$.

2. The optical image capturing lens system of claim 1, wherein a focal length of the optical image capturing lens system is f, a focal length of the second lens element is f2, and the following relationship is satisfied:

$0 < f/f2 < 0.65$.

3. The optical image capturing lens system of claim 2, wherein the focal length of the optical image capturing lens system is f, the curvature radius of the object-side surface of the third lens element is R5, and the following relationship is satisfied:

$-1.0 < f/R5 < 0$.

4. The optical image capturing lens system of claim 2, wherein an Abbe number of the first lens element is V1, an Abbe number of the third lens element is V3, and the following relationship is satisfied:

$20 < V1-V3 < 45$.

5. The optical image capturing lens system of claim 2, wherein the focal length of the optical image capturing lens system is f, a focal length of the first lens element is f1, the focal length of the second lens element is f2, a focal length of the third lens element is f3, and the following relationship is satisfied:

$1.3 < (f/f1)+(f/f2)-(f/f3) < 2.7$.

6. The optical image capturing lens system of claim 2, wherein the curvature radius of the image-side surface of the second lens element is R4, the curvature radius of the object-side surface of the third lens element is R5 and the following relationship is satisfied:

$-1.0 \leq (R4+R5)/(R4-R5) < 0$.

7. The optical image capturing lens system of claim 1, wherein the object-side surface of the second lens element is concave at a peripheral region.

8. The optical image capturing lens system of claim 1, wherein an Abbe number of the first lens element is V1, an Abbe number of the third lens element is V3, and the following relationship is satisfied:

$28 < V1-V3 < 45$.

9. The optical image capturing lens system of claim 1, wherein an axial distance between the image-side surface of the third lens element and an image plane is BL, an axial distance between the object-side surface of the first lens element and the image plane is TL, and the following relationship is satisfied:

$0.10 < BL/TL < 0.35$.

10. The optical image capturing lens system of claim 1, wherein a horizontal distance between a maximum effective diameter position on the image-side surface of the second lens element and a maximum effective diameter position on the object-side surface of the third lens element is ET23, an axial distance between the second lens element and the third lens element is T23, and the following relationship is satisfied:

$0 < ET23/T23 < 0.80$.

11. The optical image capturing lens system of claim 1, wherein a central thickness of the second lens element is CT2, a central thickness of the third lens element is CT3, and the following relationship is satisfied:

$$0<CT2/CT3<0.50.$$

12. The optical image capturing lens system of claim 1, wherein a focal length of the optical image capturing lens system is f, a focal length of the second lens element is f2, and the following relationship is satisfied:

$$0<f/f2<0.35.$$

13. The optical image capturing lens system of claim 1, wherein an axial distance between the image-side surface of the third lens element and an image plane is BID which decreases and then increases from the paraxial region to the peripheral region of the image-side surface of the third lens element.

14. An optical image capturing lens system comprising, in order from an object side to an image side:
- a first lens element with positive refractive power having an object-side surface being convex at a paraxial region;
- a second lens element with positive refractive power made of plastic material, and having an object-side surface being convex at a paraxial region and an image-side surface being concave at a paraxial region, wherein the object-side surface and the image-side surface of the second lens element are aspheric; and
- a third lens element with negative refractive power made of plastic material, and having an object-side surface being concave or planar at a paraxial region and an image-side surface being concave at a paraxial region and being convex at a peripheral region, wherein the object-side surface and the image-side surface of the third lens element are aspheric;

wherein a curvature radius of the image-side surface of the second lens element is R4, a curvature radius of the object-side surface of the third lens element is R5, a central thickness of the second lens element is CT2, a central thickness of the third lens element is CT3, and the following relationships are satisfied:

$$-1.0 \leq (R4+R5)/(R4-R5)<1.0; \text{ and}$$

$$0<CT2/CT3<0.70.$$

15. The optical image capturing lens system of claim 14, wherein a focal length of the optical image capturing lens system is f, a focal length of the second lens element is f2, and the following relationship is satisfied:

$$0<f/f2<0.65.$$

16. The optical image capturing lens system of claim 14, wherein a focal length of the optical image capturing lens system is f, the curvature radius of the object-side surface of the third lens element is R5, and the following relationship is satisfied:

$$-1.0<f/R5<0.$$

17. The optical image capturing lens system of claim 14, wherein the object-side surface of the second lens element is concave at a peripheral region.

18. The optical image capturing lens system of claim 14, wherein an Abbe number of the first lens element is V1, an Abbe number of the third lens element is V3, and the following relationship is satisfied:

$$20<V1-V3<45.$$

19. The optical image capturing lens system of claim 14, wherein a focal length of the optical image capturing lens system is f, a focal length of the first lens element is f1, a focal length of the second lens element is f2, a focal length of the third lens element is f3, and the following relationship is satisfied:

$$1.3<(f/f1)+(f/f2)-(f/f3)<2.7.$$

20. The optical image capturing lens system of claim 14, wherein an axial distance between the image-side surface of the third lens element and an image plane is BL, an axial distance between the object-side surface of the first lens element and the image plane is TL, and the following relationship is satisfied:

$$0.10<BL/TL<0.35.$$

21. The optical image capturing lens system of claim 14, wherein a horizontal distance between a maximum effective diameter position on the image-side surface of the second lens element and a maximum effective diameter position on the object-side surface of the third lens element is ET23, an axial distance between the second lens element and the third lens element is T23, and the following relationship is satisfied:

$$0<ET23/T23<0.80.$$

22. The optical image capturing lens system of claim 14, wherein an axial distance between the image-side surface of the third lens element and an image plane is BID which decreases and then increases from the paraxial region to the peripheral region of the image-side surface of the third lens element.

* * * * *

UNITED STATES PATENT AND TRADEMARK OFFICE
CERTIFICATE OF CORRECTION

PATENT NO. : 8,743,486 B2
APPLICATION NO. : 13/657075
DATED : June 3, 2014
INVENTOR(S) : Tsung-Han Tsai and Wei-Yu Chen It is certified that error appears in the above-identified patent and that said Letters Patent is hereby corrected as shown below:

In the Claims:

(1) In column 25, line 42, claim 1 of the issued patent, US 8,743,486 shows a claimed optical image capturing lens system. However, in the issued document of US 8,743,486, claim 1 is stated as follows: "object de surface being convex at a paraxial region;"
The term "object de" in the issued patent should be replaced by the correct term "object-side".
Attached Appendix 1 which was obtained through Public PAIR is page 38 of the original filling document, and the original claim 1 is appeared thereon. In Appendix 1, the original claim 1 (lines 4-5) shows "...having an object-side surface..." which are correct.

Signed and Sealed this
Ninth Day of September, 2014

Michelle K. Lee
*Deputy Director of the United States Patent and Trademark Office*